(12) United States Patent
Isobe et al.

(10) Patent No.: US 11,269,993 B2
(45) Date of Patent: Mar. 8, 2022

(54) ENCRYPTION DEVICE, ENCRYPTION METHOD, DECRYPTION DEVICE, AND DECRYPTION METHOD

(71) Applicants: SONY CORPORATION, Tokyo (JP); TECHNICAL UNIVERSITY OF DENMARK, Kongens Lyngby (DK)

(72) Inventors: Takanori Isobe, Tokyo (JP); Harunaga Hiwatari, Tokyo (JP); Andrey Bogdanov, Kongens Lyngby (DK)

(73) Assignees: SONY CORPORATION, Tokyo (JP); TECHNICAL UNIVERSITY OF DENMARK, Kongens Lyngby (DK)

(*) Notice: Subject to any disclaimer, the term of this patent is extended or adjusted under 35 U.S.C. 154(b) by 66 days.

(21) Appl. No.: 16/636,169

(22) PCT Filed: May 28, 2018

(86) PCT No.: PCT/JP2018/020341
§ 371 (c)(1),
(2) Date: Feb. 3, 2020

(87) PCT Pub. No.: WO2019/031025
PCT Pub. Date: Feb. 14, 2019

(65) Prior Publication Data
US 2021/0165875 A1    Jun. 3, 2021

(30) Foreign Application Priority Data

Aug. 10, 2017 (JP) .............................. JP2017-156144

(51) Int. Cl.
*G06F 21/54* (2013.01)
*G06F 7/58* (2006.01)
(Continued)

(52) U.S. Cl.
CPC .............. *G06F 21/54* (2013.01); *G06F 7/588* (2013.01); *G06F 21/554* (2013.01); *G06F 21/602* (2013.01); *G06F 21/82* (2013.01)

(58) Field of Classification Search
CPC ........ G06F 21/54; G06F 7/588; G06F 21/554; G06F 21/82
See application file for complete search history.

(56) References Cited

U.S. PATENT DOCUMENTS 8,422,668 B1 * 4/2013 Thichina ............. G06F 21/6209
380/28
9,015,838 B1 * 4/2015 Northup .................. H04L 9/005
726/23

(Continued)

FOREIGN PATENT DOCUMENTS

JP    2012-520589 A    9/2012
JP    2017-187724 A    10/2017

OTHER PUBLICATIONS

Key (cryptography), Wikipedia, https://en.wikipedia.org/w/index.php?title=Key_(cryptography)&oldid=793974144, Aug. 5, 2017, pp. 1-4.

(Continued)

*Primary Examiner* — Viral S Lakhia
(74) *Attorney, Agent, or Firm* — Paratus Law Group, PLLC

(57) ABSTRACT

There is provided an encryption device that is secure against a side channel attack, and can suppress a processing load. The encryption device includes a data encryption part in which at least part of a plurality of round functions for successively performing encryption processing on an input value is tabulated to be encrypted using a white-box model in which input/output values of the round function is able to be recognized from the outside. Each of the round functions includes a tabulated encryption function for encrypting an (Continued)

input value using a black-box model in which the input/output values are able to be recognized from the outside and an intermediate value is not able to be recognized from the outside, and the encryption function is updated with a random number.

15 Claims, 32 Drawing Sheets

(51) Int. Cl.
    *G06F 21/55* (2013.01)
    *G06F 21/60* (2013.01)
    *G06F 21/82* (2013.01)

(56) References Cited

U.S. PATENT DOCUMENTS

| | | | | |
|---|---|---|---|---|
| 9,270,458 | B2* | 2/2016 | Shibutani | H04L 9/002 |
| 9,294,266 | B2* | 3/2016 | Avanzi | H04L 9/0618 |
| 9,898,623 | B2* | 2/2018 | Melzani | G06F 21/72 |
| 10,277,391 | B2* | 4/2019 | Isobe | H04L 9/002 |
| 10,461,922 | B2* | 10/2019 | Murdica | H04L 9/0631 |
| 10,491,374 | B2* | 11/2019 | Moon | H04L 9/0625 |
| 10,951,402 | B2* | 3/2021 | Moon | G06F 7/58 |
| 2015/0312039 | A1* | 10/2015 | Michiels | H04L 9/3231 |
| | | | | 713/186 |
| 2017/0141911 | A1* | 5/2017 | Michiels | H04L 9/0625 |
| 2017/0149559 | A1* | 5/2017 | Michiels | H04L 9/004 |
| 2017/0353299 | A1* | 12/2017 | Takatsukasa | H04L 9/0631 |
| 2018/0167196 | A1* | 6/2018 | Cooper | G06F 21/72 |

OTHER PUBLICATIONS

Bogdanov et al., White-box Cryptography Revisited: Space-Hard Ciphers, Proceedings of the 22nd ACM SIGSAC Conference on Computer and Communications Security, Oct. 12, 2015, pp. 1058-1069.

Coron, Higher Order Masking of Look-up Tables, EUROCRYPTO 2014, May 11-15, 2014, pp. 1-21.

Bogdanov et al., Towards Practical Whitebox Cryptography: Optimizing Efficiency and Space Hardness, ASIACRYPT 2016, Dec. 4-8, 2016, pp. 1-30.

Messerges, Securing the AES Finalists Against Power Analysis Attacks, FSE 2000, Apr. 10-12, 2000, pp. 150-164.

* cited by examiner

| | ENTIRE CONFIGURATION | TYPE OF F FUNCTION/S FUNCTION | WHETHER Table size CAN BE CHANGED |
|---|---|---|---|
| CONFIGURATION B | Feistel | 1 | No |
| CONFIGURATION C | SPN | 1 | No |
| CONFIGURATION D | Feistel | MULTIPLE | Yes |
| CONFIGURATION E | SPN | MULTIPLE | Yes |

FIG.20
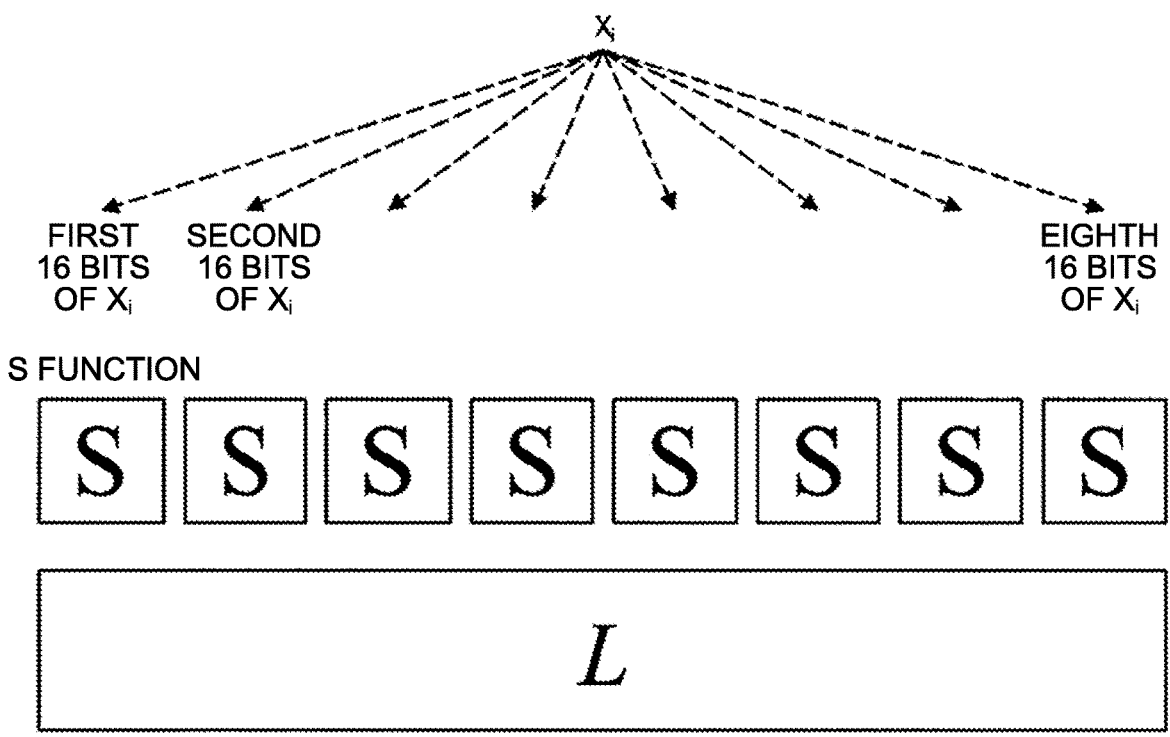
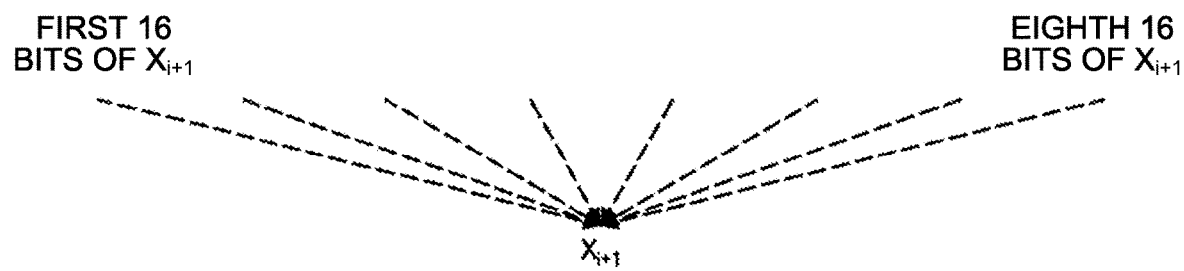

FIRST F FUNCTION (INPUT n/d bits, OUTPUT n-n/d bits)
SECOND F FUNCTION (INPUT 2n/d bits, OUTPUT n-2n/d bits)
THIRD F FUNCTION (INPUT 3n/d bits, OUTPUT n-3n/d bits)
FOURTH F FUNCTION (INPUT 4n/d bits, OUTPUT n-4n/d bits)

ENCRYPTION DEVICE, ENCRYPTION METHOD, DECRYPTION DEVICE, AND DECRYPTION METHOD

CROSS REFERENCE TO PRIOR APPLICATION

This application is a National Stage Patent Application of PCT International Patent Application No. PCT/JP2018/020341 (filed on May 28, 2018) under 35 U.S.C. § 371, which claims priority to Japanese Patent Application No. 2017-156144 (filed on Aug. 10, 2017), which are all hereby incorporated by reference in their entirety.

FIELD

The present disclosure relates to an encryption device, an encryption method, a decryption device, and a decryption method.

BACKGROUND

In the related art, the following Non Patent Literatures 1 and 2 disclose a technique by which security against a side channel attack is assumed to be improved by performing processing that is called masking on an intermediate value of encryption to eliminate dependence between the intermediate value and power consumption.

The following Patent Literatures 3 and 4 disclose an encryption scheme that is secure in a white-box model.

CITATION LIST

Non Patent Literature

Non Patent Literature 1: J-S Coron, "Higher Order Masking of Look-up Tables" EUROCRYPTO2014
Non Patent Literature 2: T. S. Messerges, "Securing the AES Finalists Against Power Analysis Attacks", FSE 2000
Non Patent Literature 3: A. Bogdanov and T. Isobe, "White-box Cryptography Revisited: Space-hard Cipher", ACM CCS 2015
Non Patent Literature 4: A. Bogdanov; T. Isobe; Elmar Tischhauser, "Towards Practical Whitebox cryptography: Optimizing Efficiency and Space Hardness", ASIA-CRYPT2016

SUMMARY

Technical Problem

However, with the method disclosed in Non Patent Literatures 1 and 2, only part of the dependence between the intermediate value and power consumption can be eliminated, so that security that is provable for a pre-assumed specific attack (d-th order attack) can be achieved, but security against an attack other than the specific attack (d+1-th order attack) cannot be ensured. That is, with the method disclosed in Non Patent Literatures 1 and 2, countermeasures can be taken while sacrificing performance depending on an assumed attack level, but resistance to an attack beyond assumption cannot be ensured.

With the method disclosed in Non Patent Literatures 1 and 2, there is the problem that a processing load is largely increased because masking processing is performed, so that a processing speed is reduced, and implementation performance is largely deteriorated. Specifically, with the method disclosed in Non Patent Literatures 1 and 2, there is the problem that the processing speed becomes about several tens of times to several thousands of times lower than that of AES as a typical encryption technique.

On the other hand, with the method disclosed in Non Patent Literatures 3 and 4, an attacker cannot acquire a cryptographic key but an encryption function is constituted of a table, so that there is the problem that the security cannot be ensured in a case in which the attacker acquires a table equivalent to the cryptographic key.

Thus, there has been a demand for an encryption operation that is secure against a side channel attack and can suppress the processing load.

Solution to Problem

According to the present disclosure, an encryption device is provided that includes: a data encryption part in which at least part of a plurality of round functions for successively performing encryption processing on an input value is tabulated to be encrypted using a white-box model in which input/output values of the round function are able to be recognized from the outside, wherein each of the round functions includes a tabulated encryption function for encrypting an input value using a black-box model in which the input/output values are able to be recognized from the outside and an intermediate value is not able to be recognized from the outside, and the encryption function is updated with a random number.

Moreover, according to the present disclosure, an encryption method is provided that includes: tabulating at least part of a plurality of round functions for successively performing encryption processing on an input value to be encrypted using a white-box model in which input/output values of the round function are able to be recognized from the outside, wherein each of the round functions encrypts an input value with an encryption function that is tabulated in a black-box model in which the input/output values are able to be recognized from the outside and an intermediate value is not able to be recognized from the outside, and the encryption function is updated with a random number.

Moreover, according to the present disclosure, a decryption device is provided that includes: a data decryption part configured to perform decryption by an inverse operation of encryption processing, the encryption processing of tabulating at least part of a plurality of round functions for successively performing encryption processing on an input value to be encrypted using a white-box model in which input/output values of the round function is able to be recognized from the outside, wherein each of the round functions encrypts an input value with an encryption function that is tabulated in a black-box model in which the input/output values are able to be recognized from the outside and an intermediate value is not able to be recognized from the outside, the encryption function to be updated with a random number.

Moreover, according to the present disclosure, a decryption method is provided that includes: performing decryption by an inverse operation of encryption processing, the encryption processing of tabulating at least part of a plurality of round functions for successively performing encryption processing on an input value to be encrypted using a white-box model in which input/output values of the round function are able to be recognized from the outside, wherein each of the round functions encrypts an input value with an encryption function that is tabulated in a black-box model in which the input/output values are able to be recognized from the outside and an intermediate value is not able to be recognized from the outside, the encryption function to be updated with a random number.

Advantageous Effects of Invention

As described above, the present disclosure is secure against a side channel attack, and can suppress a processing load.

The effects described above are not limitations, and any of the effects disclosed herein or another effect that may be grasped from the present description may be exhibited in addition to the effects described above, or in place of the effects described above.

BRIEF DESCRIPTION OF DRAWINGS

FIG. 20 is a schematic diagram illustrating a case in which n=128 and d=8 in FIG. 18.

DESCRIPTION OF EMBODIMENTS

Figure 1:
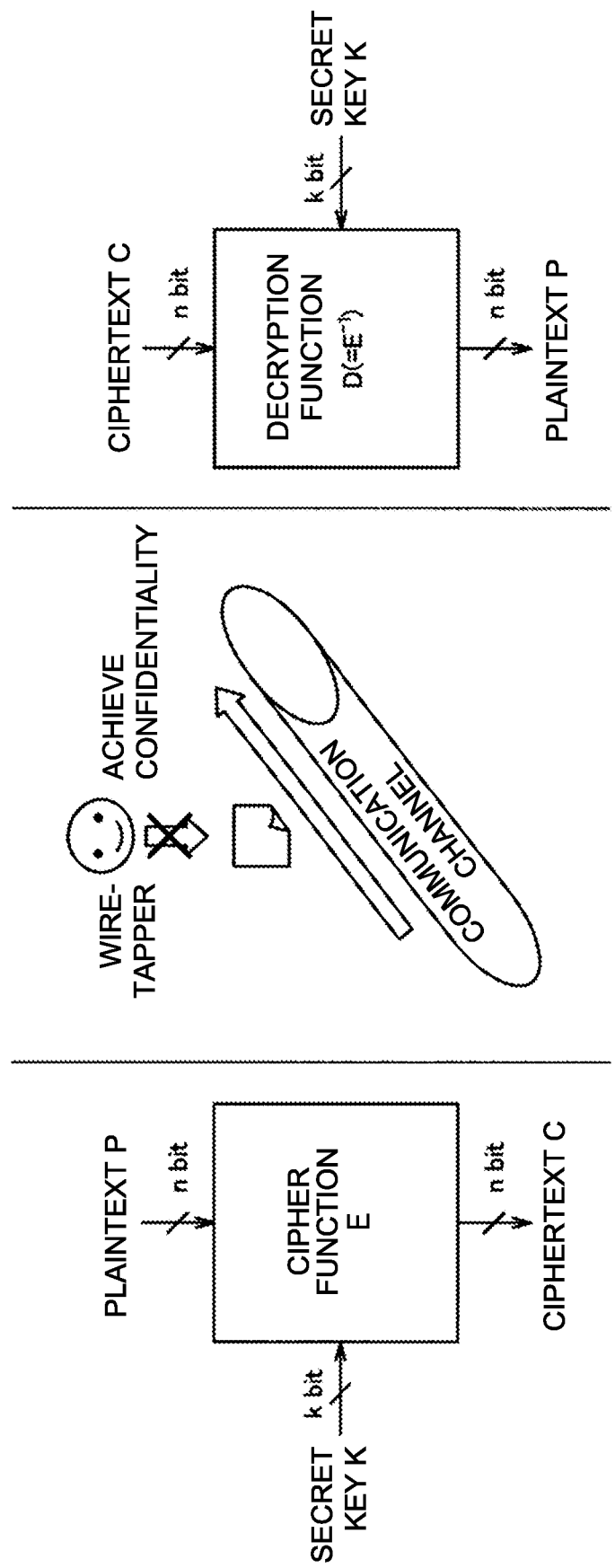
FIG. 1 is a schematic diagram illustrating a common key block cipher.

The following describes a preferred embodiment of the present disclosure in detail with reference to the attached drawings. In the present description and the drawings, constituent elements having substantially the same functional configuration are denoted by the same reference numeral, and redundant description will not be repeated.

The description will be made in the following order.
1. Technique as precondition
2. Outline of embodiment
3. Specific configuration example
3.1. Specific example (B)
3.2. Specific example (C)
3.3. Specific example (D)
3.4. Specific example (E)
4. Regarding effect obtained by encryption related to white-box model
5. Configuration that is secure in gray-box model
6. Configuration example for decryption
7. Difference from existing technique
8. Example of application to which embodiment is applied 1. Technique as Precondition There is known a common key block cipher technique that uses the same key for encryption and decryption. FIG.

1 is a schematic diagram illustrating a common key block cipher, and illustrates an n-bit common key block cipher algorithm E corresponding to a key length of k-bit. At the time of encryption, ciphertext C (n-bit) is generated from plaintext P (n-bit) with a cipher function E using a k-bit secret key K. At the time of decryption, the plaintext P (n-bit) is generated from the ciphertext C (n-bit) with a decryption function D ($=E^{-1}$) using the k-bit secret key K. With such a common key block cipher, for example, in a case in which data is transmitted to a communication channel as illustrated in FIG. 1, confidentiality of the plaintext for a wiretapper (hereinafter, also referred to as an attacker) can be achieved.

A bit length of the plaintext P and the ciphertext C is referred to as a block size, which is represented by n herein. n may be an optional integer value, and is typically determined to be one value for each block cipher algorithm in advance. A block cipher having a block length of n is referred to as an n-bit block cipher in some cases. The bit length of the secret key K is represented by k, and the bit length k of the key may be an optional integer value. The common key block cipher algorithm corresponds to one or a plurality of key sizes. For example, a configuration may be such that a certain block cipher algorithm A has a block size of n=128, and corresponds to the key size of k=128, k=192, or k=256.

A decryption algorithm D corresponding to the encryption algorithm E can be defined as an inverse function $E^{-1}$ of the encryption algorithm E, receives the ciphertext C and the key K as an input, and outputs the plaintext P.

Figure 2:
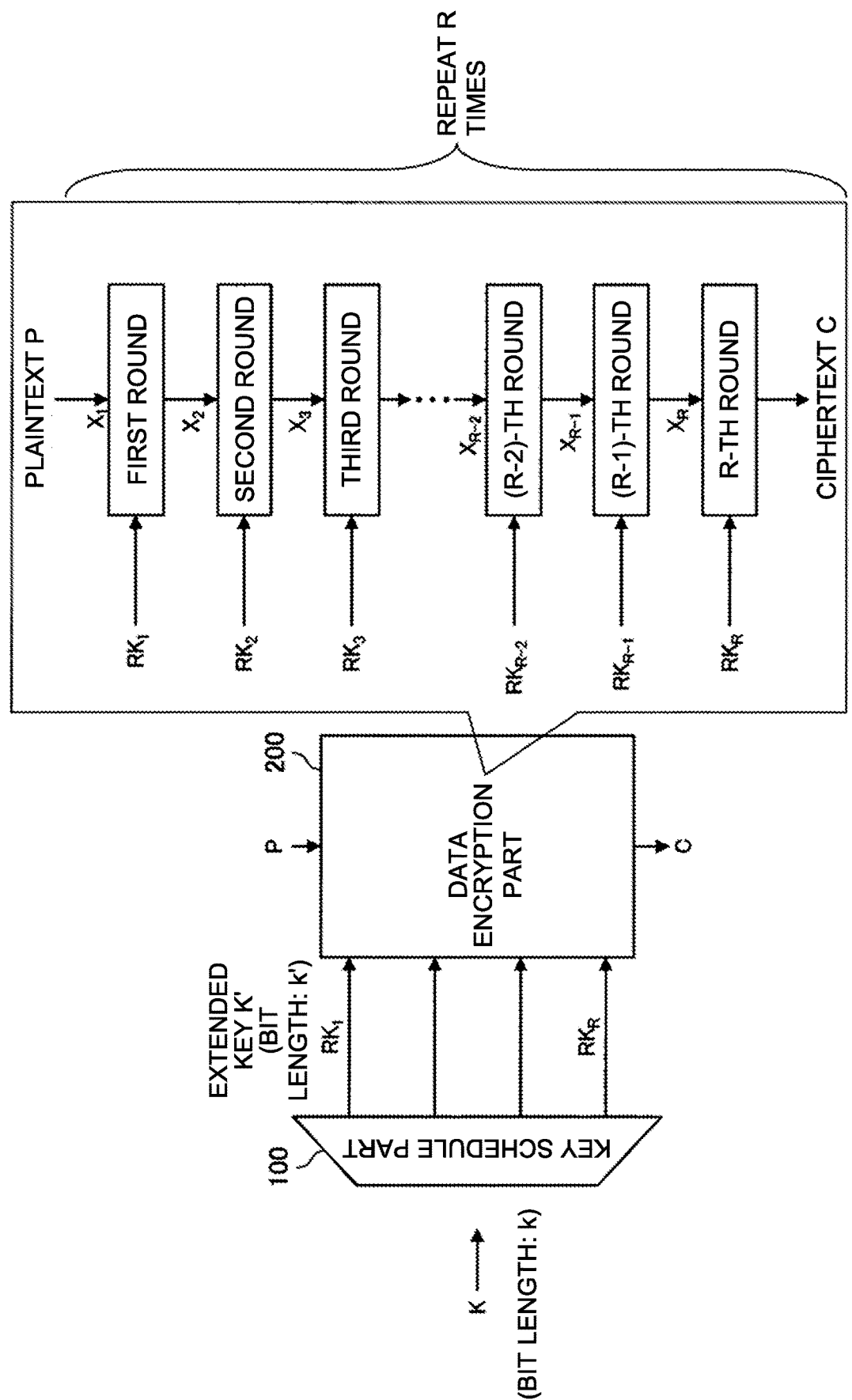
FIG. 2 is a schematic diagram illustrating an internal configuration of a block (cipher function E) for performing encryption.

FIG. 2 is a schematic diagram illustrating an internal configuration of a block (encryption function E) for performing encryption. The encryption function E is constituted of a key schedule part 100 and a data encryption part 200. The key schedule part 100 receives the secret key K as an input, and outputs an extended key K' (bit length k') obtained by extending the bit length through a certain determined step. The data encryption part 200 receives the plaintext P, receives the extended key K' that has been extended from the key schedule part, and converts data to output the ciphertext C. The data encryption part 200 performs encryption by repeatedly processing a round function obtained from the extended key K'.

It is assumed that the data encryption part 200 can be divided into round functions as processing units. The round function receives two pieces of data as an input, processes the pieces of data inside itself, and outputs one piece of data. One of the pieces of input data is n-bit data during the process of encryption, and an output of the round function in a certain round is supplied thereto as an input for the next round function. The other one of the pieces of input data is data of part of the extended key K' output from the key schedule part 100, and this key data is referred to as a round key. The total number of round functions is referred to as a total round number. The total round number is a value that is determined in advance for each encryption algorithm. Herein, the total round number is represented by R. Assuming that input data in the first round from an input side of the data encryption part 200 is $X_1$, data input to the i-th round function is Xi, and the round key is RKi, the configuration of the data encryption part 200 is represented as in FIG. 2.

The round function may take various forms in accordance with the block cipher algorithm. The round function can be classified in accordance with a structure employed by the cipher algorithm. As representative structures, an SPN structure, a Feistel structure, and an extended Feistel structure are exemplified herein.

Figure 3:
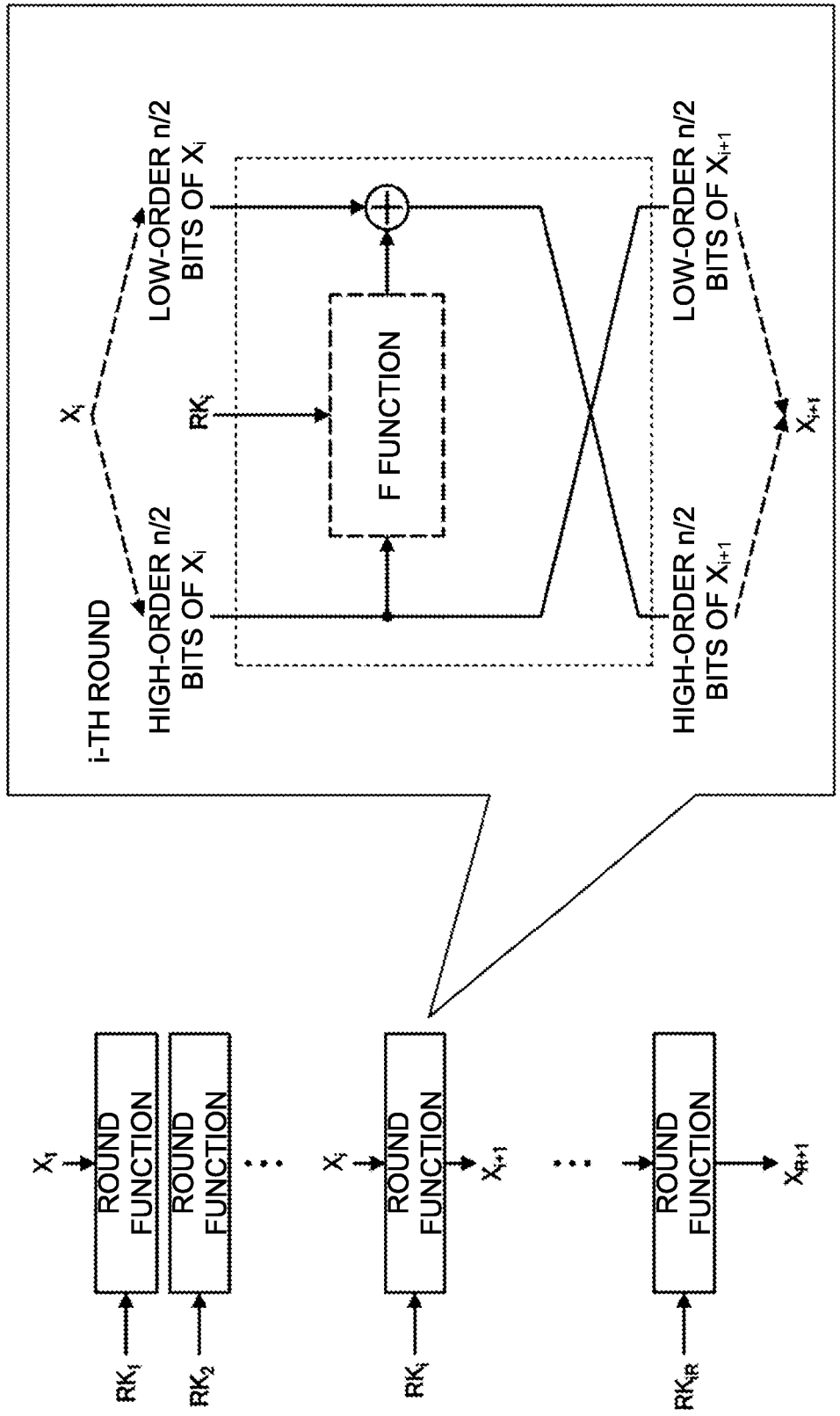
FIG. 3 is a schematic diagram illustrating a Feistel structure.
Figure 4:
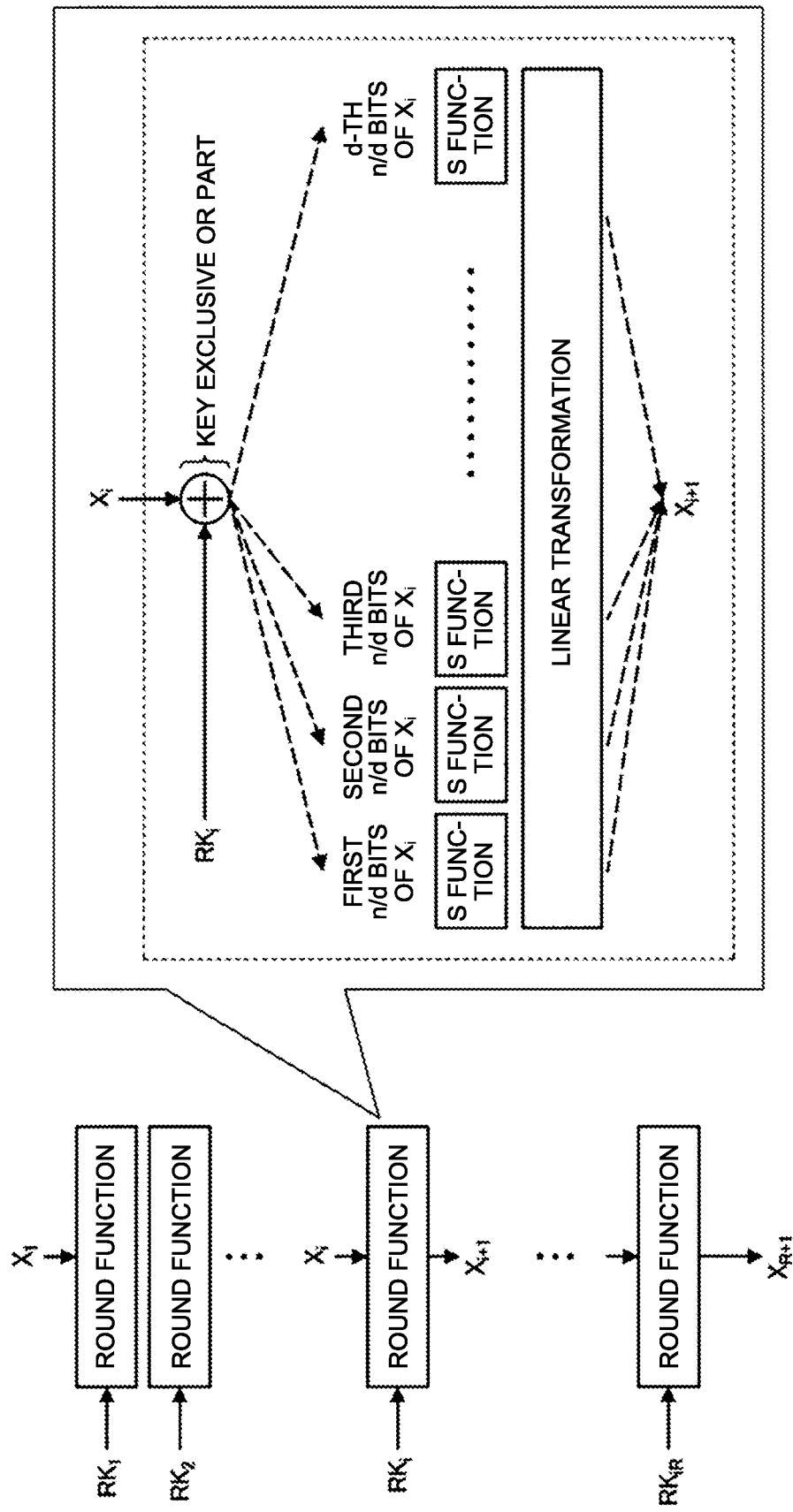
FIG. 4 is a schematic diagram illustrating an SPN structure.

FIG. 3 is a schematic diagram illustrating the Feistel structure. FIG. 4 is a schematic diagram illustrating the SPN structure. In a basic configuration example of the Feistel structure illustrated in FIG. 3, n-bit input data $X_i$ is divided into high-order n/2 bits and low-order n/2 bits for each round function, and a size of data in each line is n/2 bits. In this case, the high-order n/2 bits are input to an F function, and n/2 bits are output therefrom. This output is exclusive-ORed to the respective low-order n/2 bits. Thereafter, data in which the left part and the right part are replaced with each other is assumed to be output data $X_{i+1}$. The F function is configured based on a non-linear function. Unlike the SPN structure, the F function is not necessarily substitution. Typically, the F function is not generated from the block cipher, but generated by non-linear operation as light calculation. However, in the embodiment, the F function is generated from the block cipher.

The extended Feistel structure (generalized Feistel structure) is obtained by extending the Feistel structure to cause the number of data divisions to be three or more from two. Assuming that the number of divisions is d, various extended Feistel structures can be defined with the number of divisions d. A size of an input/output of the F function becomes relatively small, so that it is appropriate for miniaturized implementation. Additionally, each round function can have a plurality of F functions.

Figure 14:
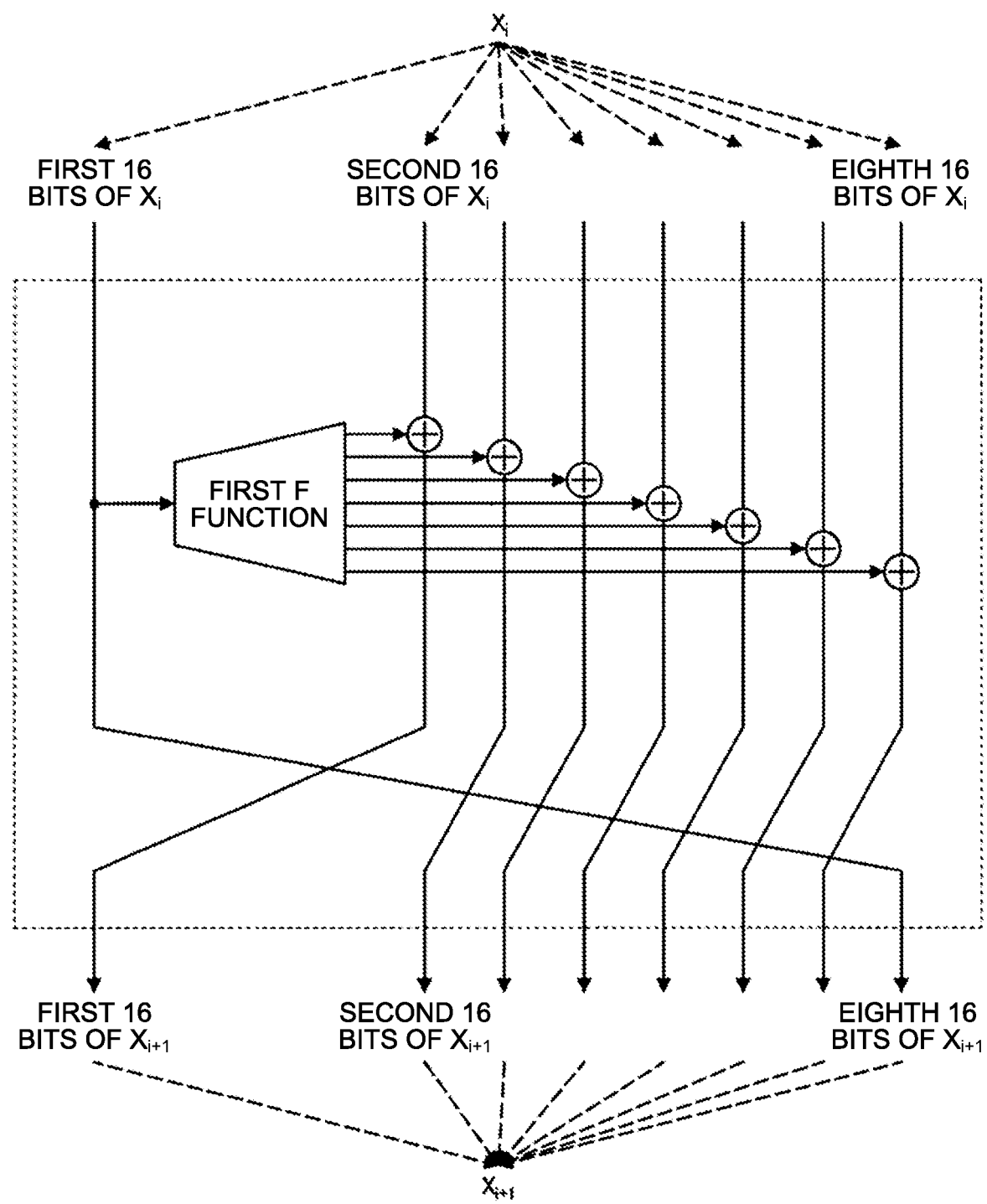
FIG. 14 is a schematic diagram illustrating the entire configuration in a case in which n=128, c=1, and d=8 in FIG. 10.
Figure 17:
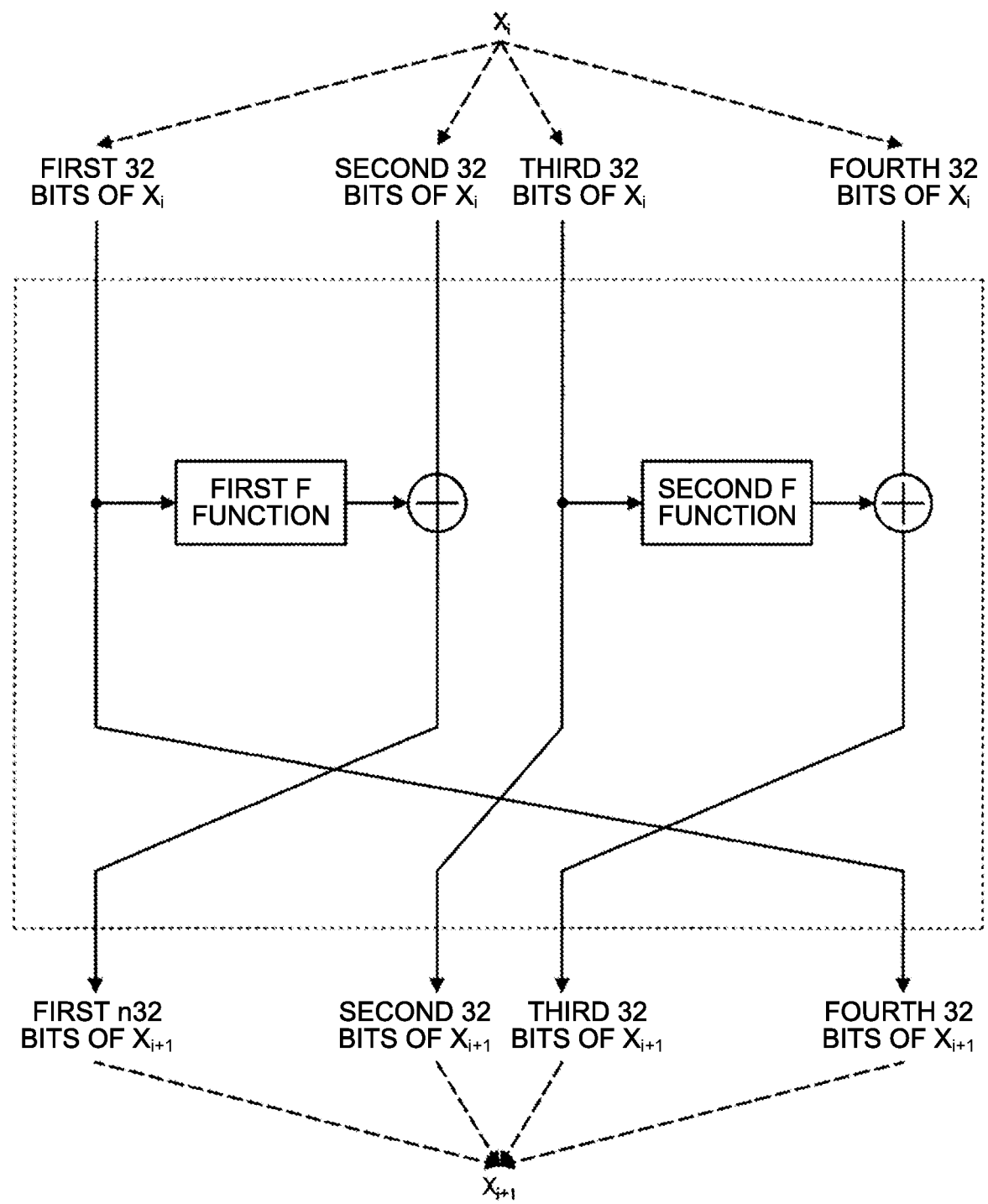
FIG. 17 is a schematic diagram illustrating an example in which there are two F functions in one round, and n=128 and d=4.

FIG. 17 (described later) illustrates an example of the extended Feistel structure in a case in which d=4 and two F functions are applied in parallel in one round. In this example, $RK1_i$ and $RK2_i$ are caused to be key inputs for a first F function and a second F function, respectively. FIG. 14 (described later) illustrates an example of the extended Feistel structure in a case in which d=8 and one F function is applied in one round. In this example, an input size to the F function is n/8 bits, an output size from the F function is 7n/8 bits, and the output is divided into seven pieces of data of n/8 bits to be exclusive-ORed to the other seven pieces of 16-bit data. It is assumed that n=128 bits.

In a basic configuration example of the SPN structure illustrated in FIG. 4, processing such as an exclusive OR operation with the round key, non-linear transformation, linear transformation, and the like are applied to all pieces of n-bit input data. A non-linear transformation part is referred to as an S-layer (Substitution-layer) and a linear transformation part is referred to as a P-layer (Permutation-layer). Each of the S-layer and the P-layer is substitution (a bijective function). In each round function, the n-bit input data Xi is divided into d sorts of data, and a size of the data in each line becomes n/d [bit]. The non-linear transformation operation is defined as an S function, and a non-linear transformation operation S-layer (Substitution-layer) of an input/output of n/d [bit] is executed for each piece of data. Thereafter, n-bit input/output linear transformation L is executed as a linear transformation P-layer (Permutation-layer). The linear transformation operation is defined as an L function.

Figure 5:
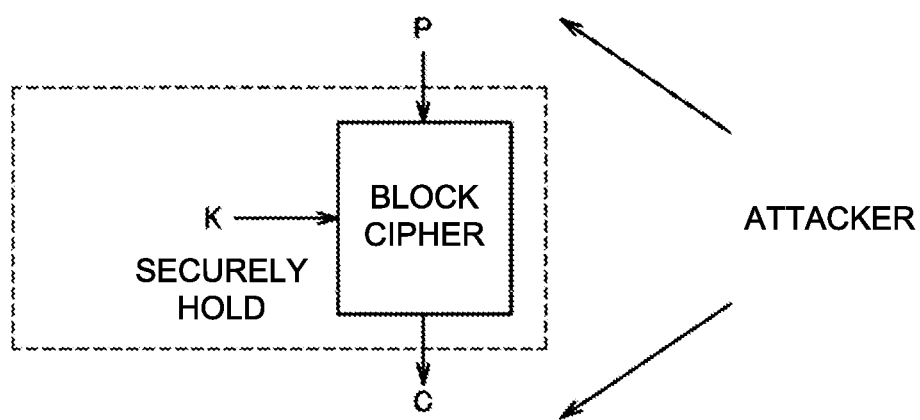
FIG. 5 is a schematic diagram illustrating a black-box model constituted of a common key block cipher.

As a security model of the block cipher, a black-box model and a white-box model can be exemplified. FIG. 5 is a schematic diagram illustrating the black-box model constituted of a common key block cipher. In the black-box model, a capacity of the attacker who wants to get the secret key can recognize and freely control input/output of the block cipher, but the attacker cannot recognize an intermediate value of the block cipher. That is, the black-box model is a security model in which the attacker can access only the plaintext P and the ciphertext C as an input and an output of the block cipher algorithm. An attack made by the attacker can be classified into a known plaintext/ciphertext attack in which the attacker knows only a value of a pair of the plaintext P and the ciphertext C, and a chosen plaintext/ciphertext attack in which the attacker can further freely control the value itself. In the black-box model, it is assumed that cipher operation itself is securely executed, and the attacker cannot see or falsify the intermediate value of the cipher. The black-box model corresponds to a case in which hardware support and the like are utilized, and tamper resistance of the cipher operation is guaranteed. A method of implementing a cipher algorithm for a black box is referred to as black-box implementation. In such a black-box model, design can be securely made so that the attacker cannot find the secret key. In the black-box model, the block cipher is designed so that the secret key K is difficult to be obtained in view of a calculation amount (resistance to a key recovery attack), and the block cipher is difficult to be distinguished from substitution with a pseudo-random key in view of a calculation amount (resistance to a distinguishing attack). A secure block cipher for the black-box model can be, for example, implemented by an encryption technique such as AES, CLEFIA, PRESENT, and Piccolo.

Figure 6:
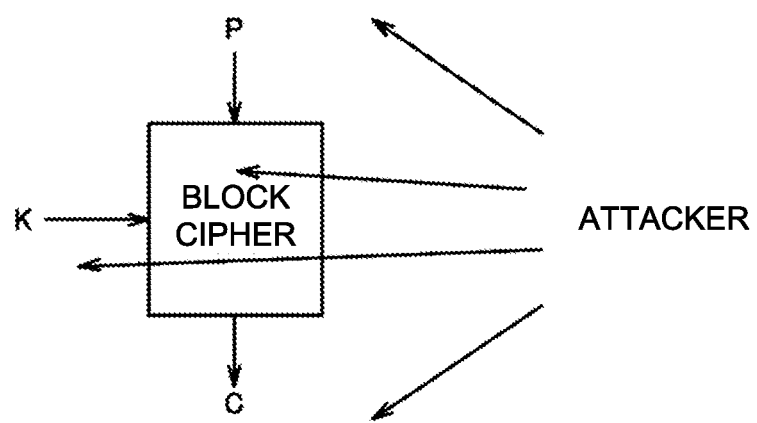
FIG. 6 is a schematic diagram illustrating a white-box model constituted of a common key block cipher.

FIG. 6 is a schematic diagram illustrating a white-box model constituted of a common key block cipher. The white-box model is a security model assuming a stronger attacker than in the black-box model, and the attacker can freely access not only the plaintext P and the ciphertext C as an input and an output of the block cipher algorithm but also the intermediate value of the arithmetic operation. In the white-box model, it is assumed that the attacker can freely control the plaintext P and the ciphertext C as an input of the block cipher, and the attacker can also see or falsify an optional intermediate value in the arithmetic operation. The white-box model corresponds to a case in which tamper resistance cannot be guaranteed due to implementation constraint such as all software without support for hardware. Additionally, the white-box model corresponds to a case in which the intermediate value is leaked due to implementation vulnerability such as buffer overflow, malware, and the like. A method of implementing a cipher algorithm for a white box is referred to as white-box implementation. With the white-box implementation, the block cipher can be configured only with software.

In this way, in the white-box model, the capacity of the attacker can recognize and freely control input/output of the block cipher, and can recognize and freely control the intermediate value of the block cipher. In the white-box model, it is required to be difficult for the attacker to obtain the key K in view of a calculation amount. Additionally, resistance to an attack directly using a code itself to be used as a large key (what is called code lifting) instead of obtaining the key K is required. The white-box model in which the attacker can recognize the intermediate value of the block cipher needs to have quantitative security against such an attack.

2. Outline of Embodiment

The embodiment provides a technique of securely performing cipher decryption and a technique of protecting the secret key in an unreliable execution environment in the white-box model described above. As the unreliable environment, exemplified are a case in which the secret key cannot be securely kept, and a case in which the attacker can recognize the intermediate value of the cipher operation.

Figure 7:
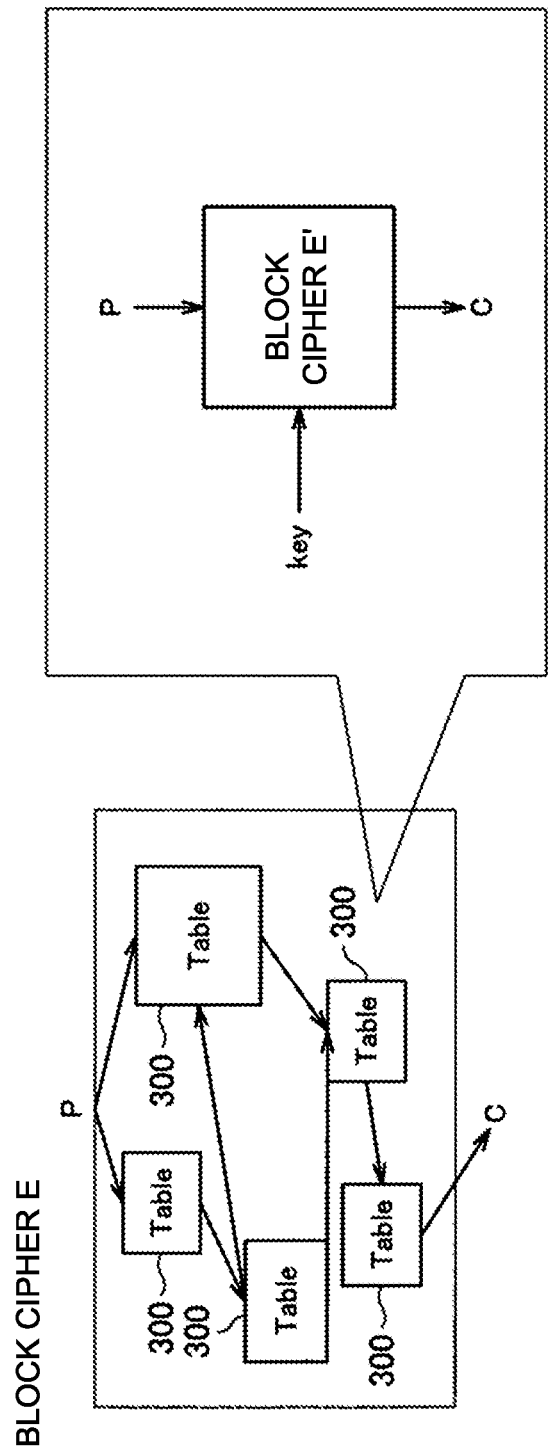
FIG. 7 is a schematic diagram illustrating an outline of an encryption technique according to an embodiment.

FIG. 7 is a schematic diagram illustrating an outline of the encryption technique according to the embodiment, and illustrates an encryption device according to a basic configuration example (A). The block cipher E is configured with a plurality of tables 300, and each table is configured as a block cipher E' (internal block cipher) that is secure in the black-box model. Due to this, the secure block cipher E can be configured. In the white-box implementation, part or all of components constituted of the block cipher E' are tabulated to be implemented. An algorithm for the block cipher E' can be freely selected by the user. The encryption device can be configured with a central processing unit such as a CPU, and a computer program for causing the central processing unit to function. In this case, the computer program can be stored in a recording medium such as a memory included in the encryption device. The tables constituting the block cipher can be stored in the recording medium included in the encryption device.

In this way, in the basic configuration example (A) according to the embodiment, the block cipher E that is secure in the white-box model is configured with the block cipher E' that is secure in the black-box model as a constituent element (component). The algorithm of the internal block cipher E' can be freely selected by the user, and received as an input. In the white-box implementation, a function based on the internal block cipher E' is caused to depend on a key, and part or all of the functions are implemented as a table. That is, the internal block cipher E' is generated to be tabulated with the extended key K' output from the key schedule part 100. Through the tabulation, confidentiality of the key can be largely enhanced as compared with a case in which an encryption operation is performed each time.

As a specific example (B) of the configuration example (A), the block cipher E has the Feistel structure and is constituted of F functions of one type of input/output size, and the F function is generated based on the internal block cipher E'. In this case, the F function is converted from E' by fixing part of the input of the internal block cipher E' and disregarding part of the output thereof. In the white-box implementation, all of the F functions are implemented as a table.

As a specific example (C) of the configuration example (A), the block cipher E has the SPN structure and is constituted of S functions of one type of input/output size, and the S function is generated based on the internal block cipher E'. In this case, the S function is constituted of internal block ciphers having the same size. In the white-box implementation, all of the S functions are implemented as a table.

As a specific example (D) of the configuration example (A), the block cipher E has the extended Feistel structure and is constituted of F functions having a plurality of types of input/output size, and the F function is generated based on the internal block cipher E'. In this case, the F function is generated by fixing part of the input of the internal block cipher, and disregarding part of the output thereof. In the white-box implementation, part or all of the F functions are implemented as a table.

As a specific example (E) of the configuration example (A), the block cipher E has the SPN structure and is constituted of S functions having a plurality of types of input/output size, and the S function is generated based on the internal block cipher E'. In this case, the S function is constituted of internal block ciphers having the same size. In the white-box implementation, part or all of the S functions are implemented as a table.

Figures 8, 9:
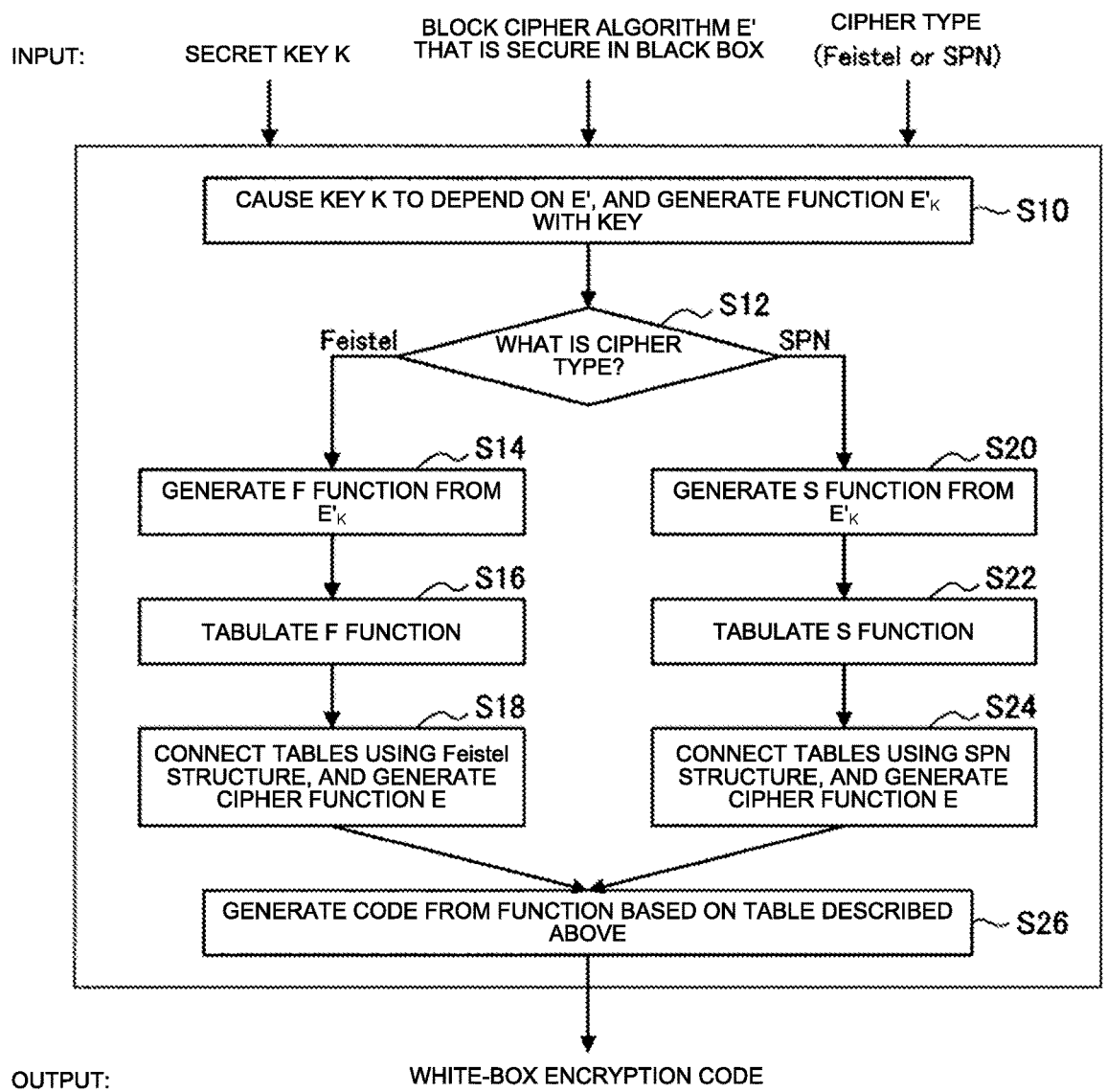
FIG. 8 is a schematic diagram illustrating the entire configuration, a type of F function/S function, and whether a table size can be changed for each of a specific example (B), a specific example (C), a specific example (D), and a specific example (E).
FIG. 9 is a flowchart illustrating processing corresponding to a cipher type.

FIG. 8 is a schematic diagram illustrating the entire configuration, the type of the F function/S function, and whether the table size can be changed for each of the specific example (B), the specific example (C), the specific example (D), and the specific example (E).

FIG. 9 is a flowchart illustrating processing corresponding to a cipher type. In FIG. 9, first, the key K is caused to depend on the internal block cipher E' at Step S10, and a function E'$_K$ with a key is generated. Next, the cipher type is determined at Step S12, and if the cipher type is the Feistel structure, the process proceeds to Step S14. At Step S14, the F function is generated from E'$_K$. Next, at Step S16, the F function is tabulated. Next, at Step S18, the tables are connected using the Feistel structure, and the cipher function E is generated.

If the cipher type is determined to be the SPN structure at Step S12, the process proceeds to Step S20, and the S function is generated from E'$_K$. Next, the S function is tabulated at Step S22. Next, at Step S24, the tables are connected using the SPN structure, and the cipher function E is generated. After Steps S18 and S24, the process proceeds to Step S26, and a code is generated from a function based on the table. Due to this, a white-box encryption code is generated.

3. Specific Configuration Example

The following describes configuration examples and effects of the specific example (B), the specific example (C), the specific example (D), and the specific example (E) in detail. Herein, it is assumed that the internal block cipher E' is an n'-bit block cipher, and is secure in the black-box model.

3.1. Specific Example (B)

Figure 10:
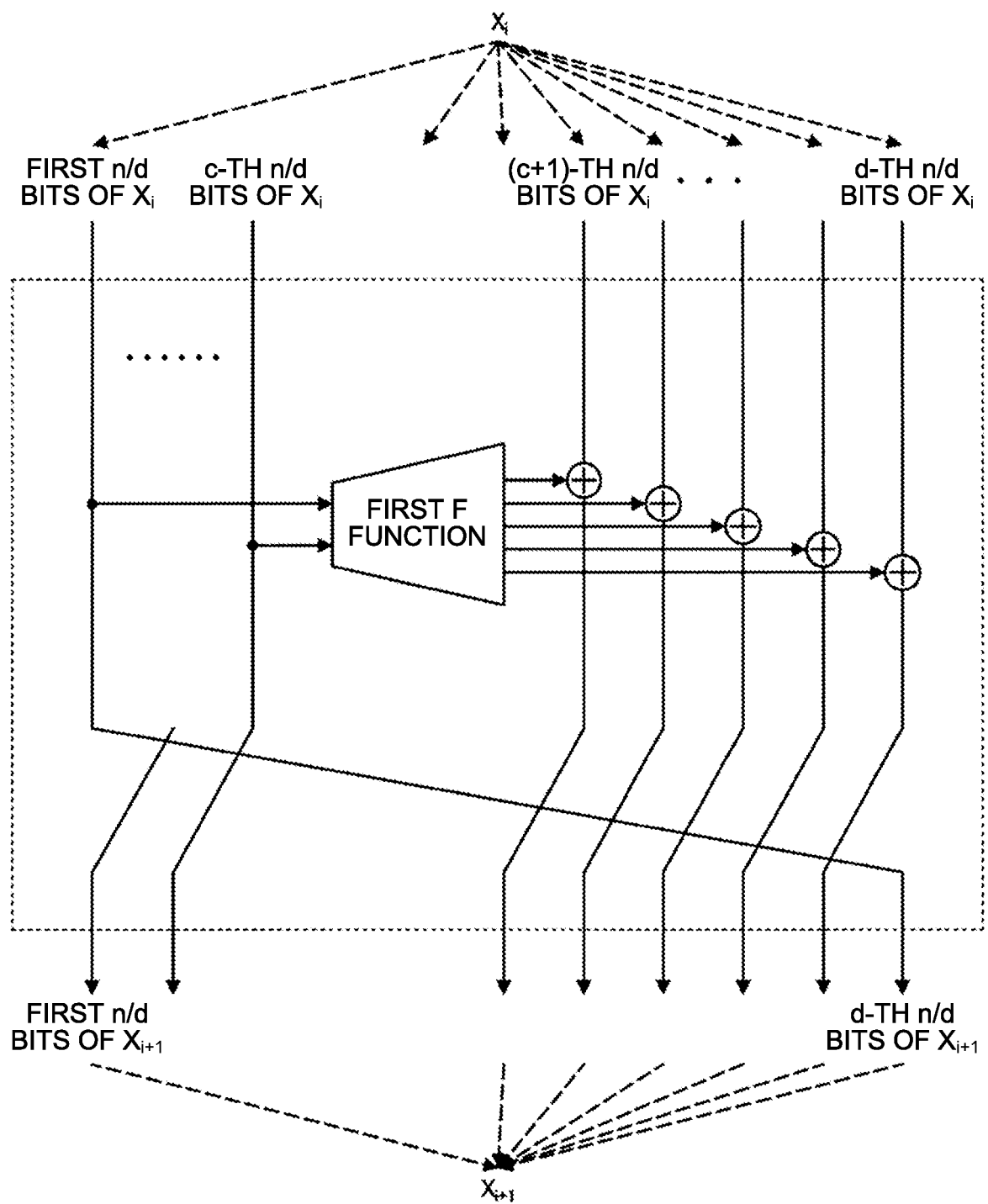
FIG. 10 is a schematic diagram illustrating the specific example (B).

FIG. 10 is a schematic diagram illustrating the specific example (B), and illustrates the configuration example using the generalized Feistel structure. In the example illustrated in FIG. 10, the n-bit input data Xi is divided into d sorts of data, and the size of the data in each line is n/d bits. In this case, data of c sorts of lines is input to the F function with an input of c×n/d bits and an output of (d−c)×(n/d) (=n−(c× n/d)) [bit], and the output is divided into d−c sorts of data of n/d [bit] to be exclusive-ORed to the other d−c sorts of lines. The F function is configured based on the internal block cipher E'. Herein, it is assumed that a block size n' of E' satisfies n'>(d−c)×(n/d) and n'>c×(n/d) (condition 1). As illustrated in FIG. 10, a value of bits input to the block cipher E' is output as a lower-order bit than a value of bits obtained through the exclusive OR.

Figure 11:
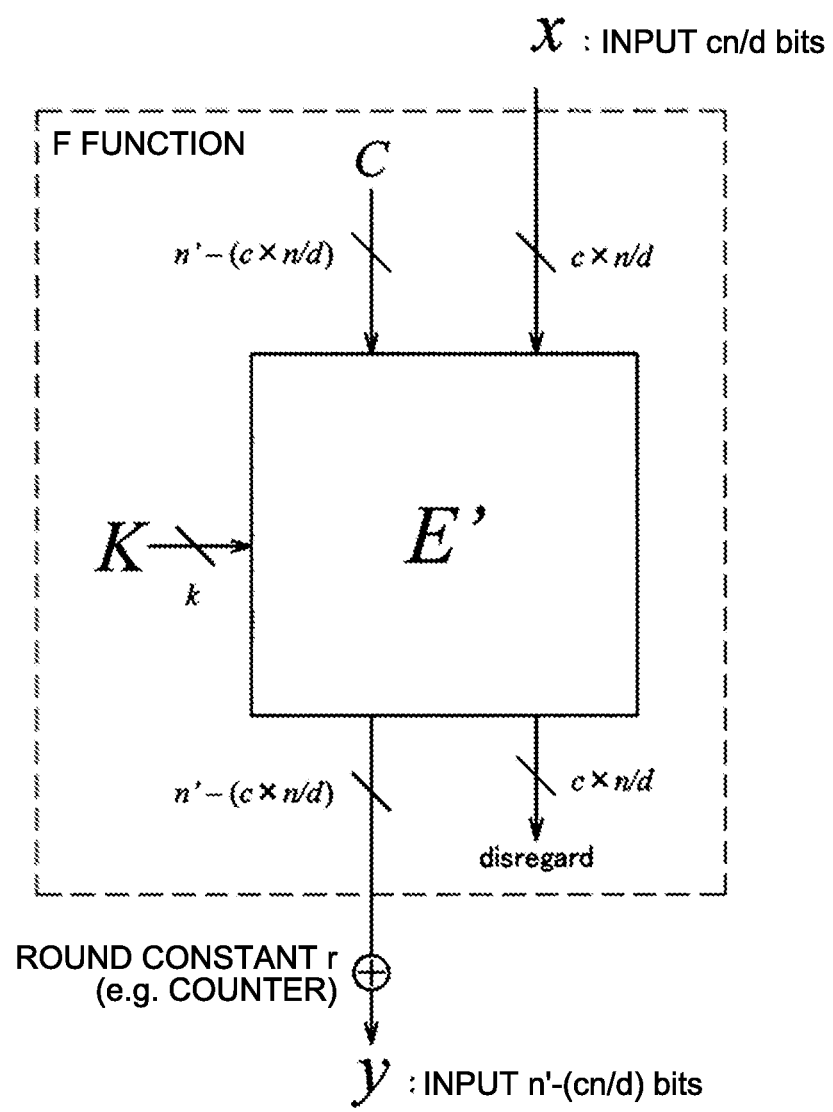
FIG. 11 is a schematic diagram illustrating a configuration of the F function.

FIG. 11 is a schematic diagram illustrating a configuration of the F function. The following describes a method of configuring the F function with the input of c×n/d [bit] and the output of (d−c)×(n/d) [bit] from the n'-bit internal block cipher E'. First, as illustrated in FIG. 11, of the input n' [bit] of the internal block cipher E', optional n'−(c×n/d) [bit] is fixed to a constant value (for example, all 0), and the input size is caused to be c×n/d. Next, optional (c×n/d) [bit] of the output is disregarded to cause the output size to be n'−(c× n/d). In this way, the F function is configured from an optional internal block cipher E' satisfying the condition 1 by fixing part of input bits and disregarding part of outputs for the internal block cipher E'. Due to tabulation, the F function is constituted of the table corresponding to n'-bit input/output. For example, in a case of 8-bit input/output, generated is a table in which an output value is associated with an input value (0 to 255). By fixing part of the input bits and disregarding part of the outputs for this table, the number of input/output bits such as 8-bit input and 120-bit output can be adjusted. In this case, to change the F function for each round, a constant specific to the round is exclusive-ORed (XORed) to the output of n'−(c×n/d) bits. For example, the constant specific to the round is assumed to be a round number, and the round number is XORed thereto. In a case in which the round number is 4, 4 is XORed thereto. However, this exclusive OR is performed after a table lookup, so that this arithmetic operation itself is not included in the table. Due to this, the F function different for each round can be represented with one sort of F function table. Thus, the F function itself of each round function can be configured in common, and a memory region for storing the table can be largely reduced.

Figure 12:
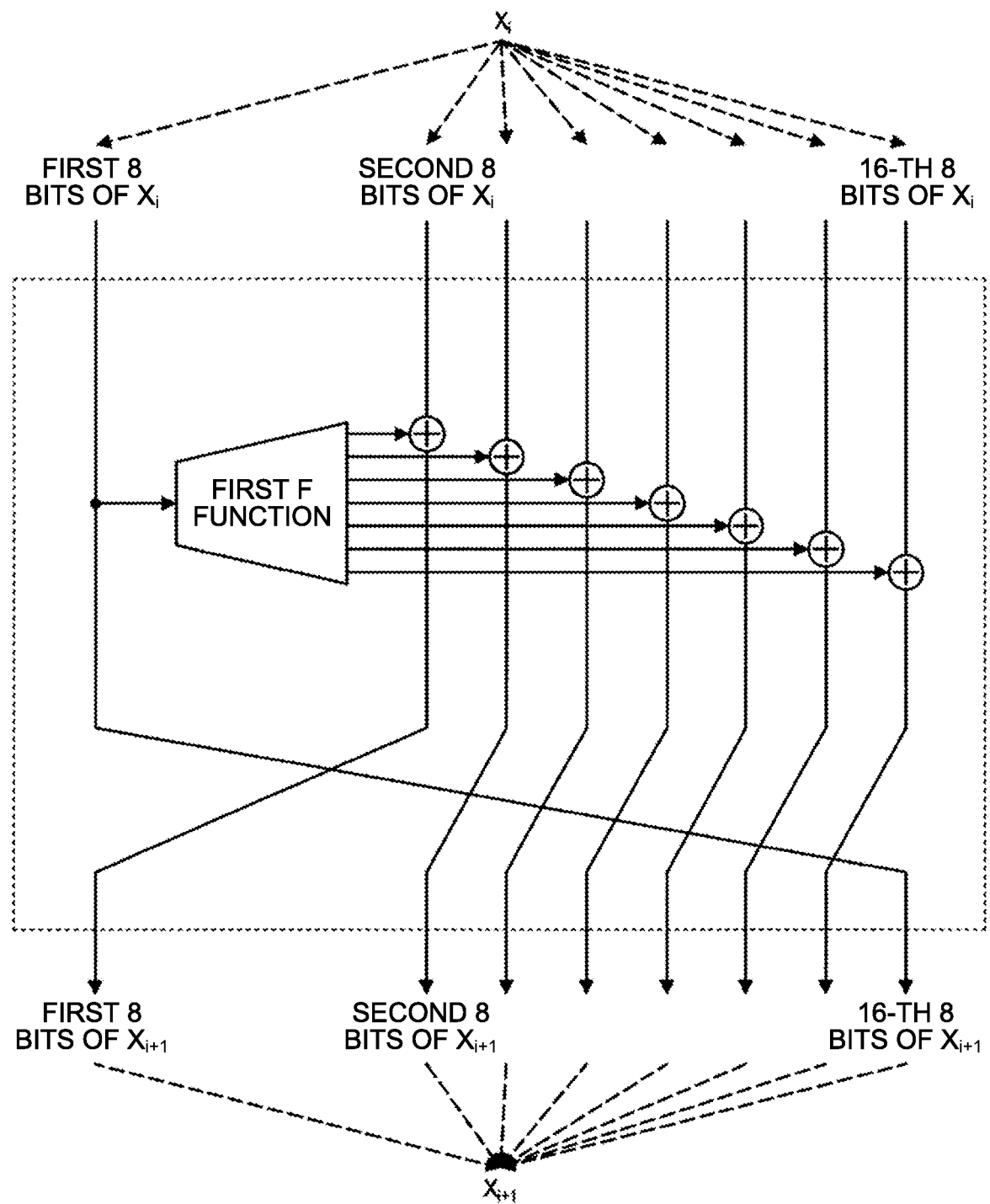
FIG. 12 is a schematic diagram illustrating the entire configuration in a case in which n=n'=128, c=1, and d=16 in FIG. 10.
Figure 13:
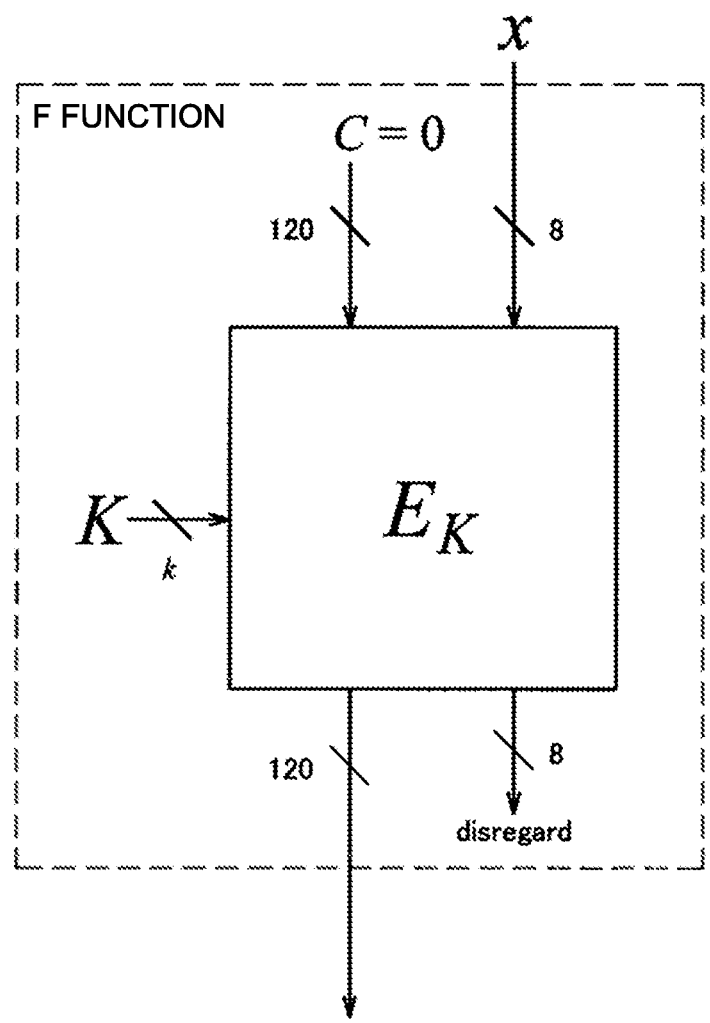
FIG. 13 illustrates a configuration of the F function in the example of FIG. 12.
Figure 15:
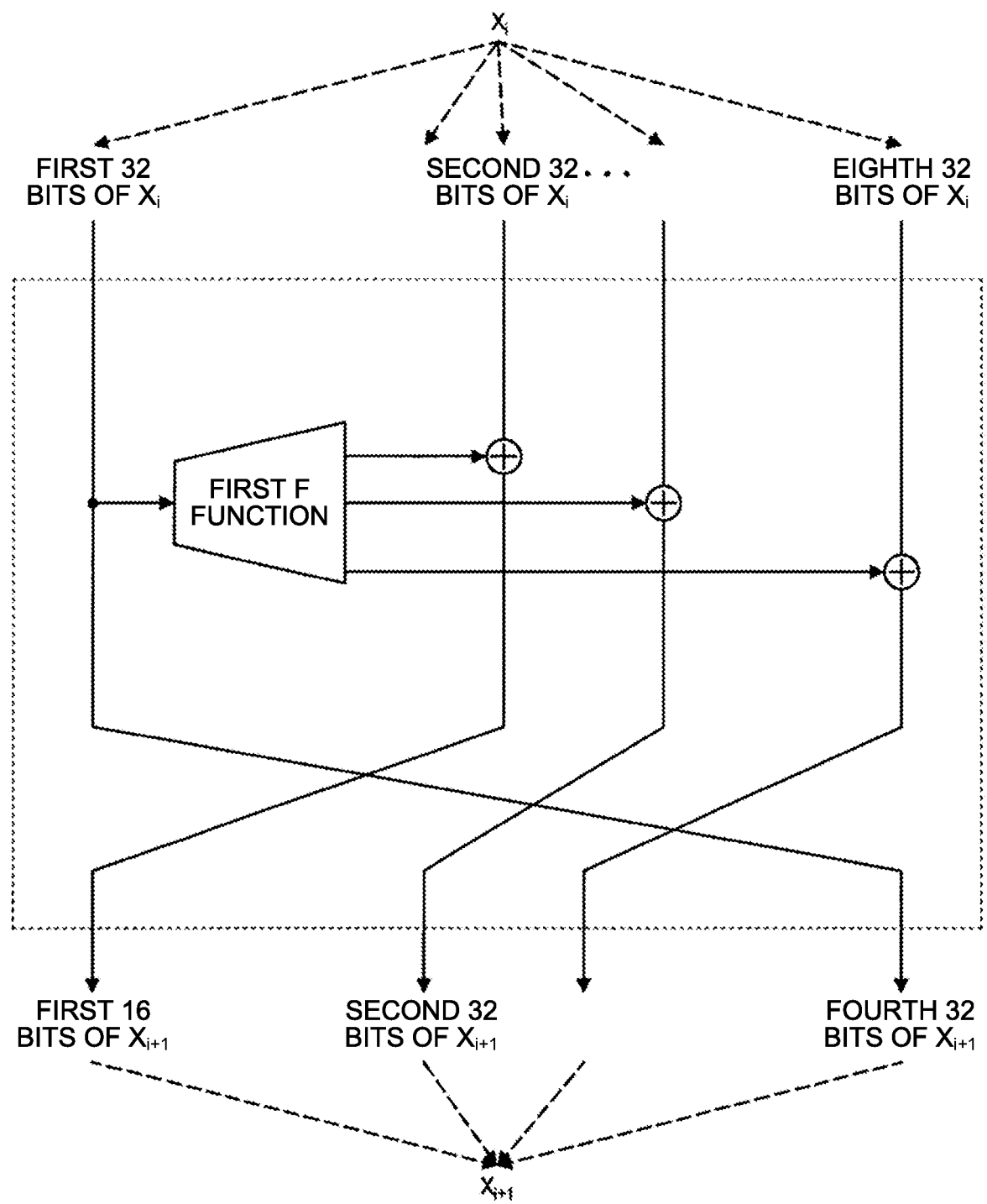
FIG. 15 is a schematic diagram illustrating the entire configuration in a case in which n=128, c=1, and d=4 in FIG. 10.
Figure 16:
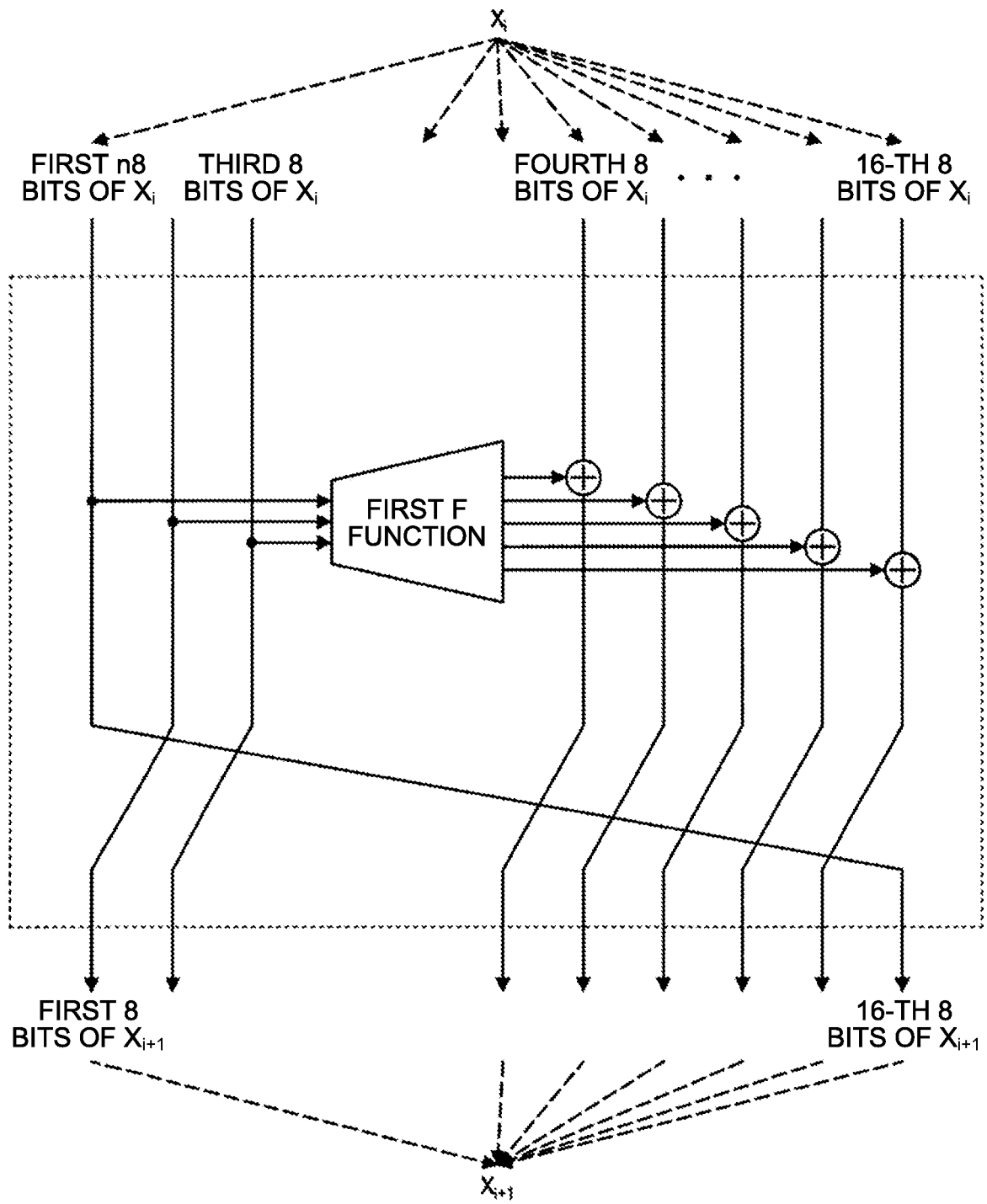
FIG. 16 is a schematic diagram illustrating the entire configuration in a case in which n=128, c=3, and d=16 in FIG. 10.

FIG. 12 to FIG. 15 are schematic diagrams illustrating specific configuration examples. FIG. 12 illustrates the entire configuration in a case in which n=n'=128, c=1, and d=16, and FIG. 13 illustrates the configuration of the F function in the example of FIG. 12. FIG. 14 illustrates a case in which n=128, c=1, and d=8, FIG. 15 illustrates a case in which n=128, c=1, and d=4, and FIG. 16 illustrates a case in which n=128, c=3, and d=16.

FIG. 17 is a schematic diagram illustrating an example in which there are two F functions in one round, and n=128 and d=4. In all of the examples described above, the F function is implemented as a table in the white-box implementation. In the examples of FIG. 12, FIG. 14, FIG. 15, and FIG. 16, the table size (the size of the F function) is about 3.84 [byte], 918 [Kbyte], 51.5 [Gbyte], and 218 [Mbyte], respectively.

3.2. Specific Example (C)

Figure 18:
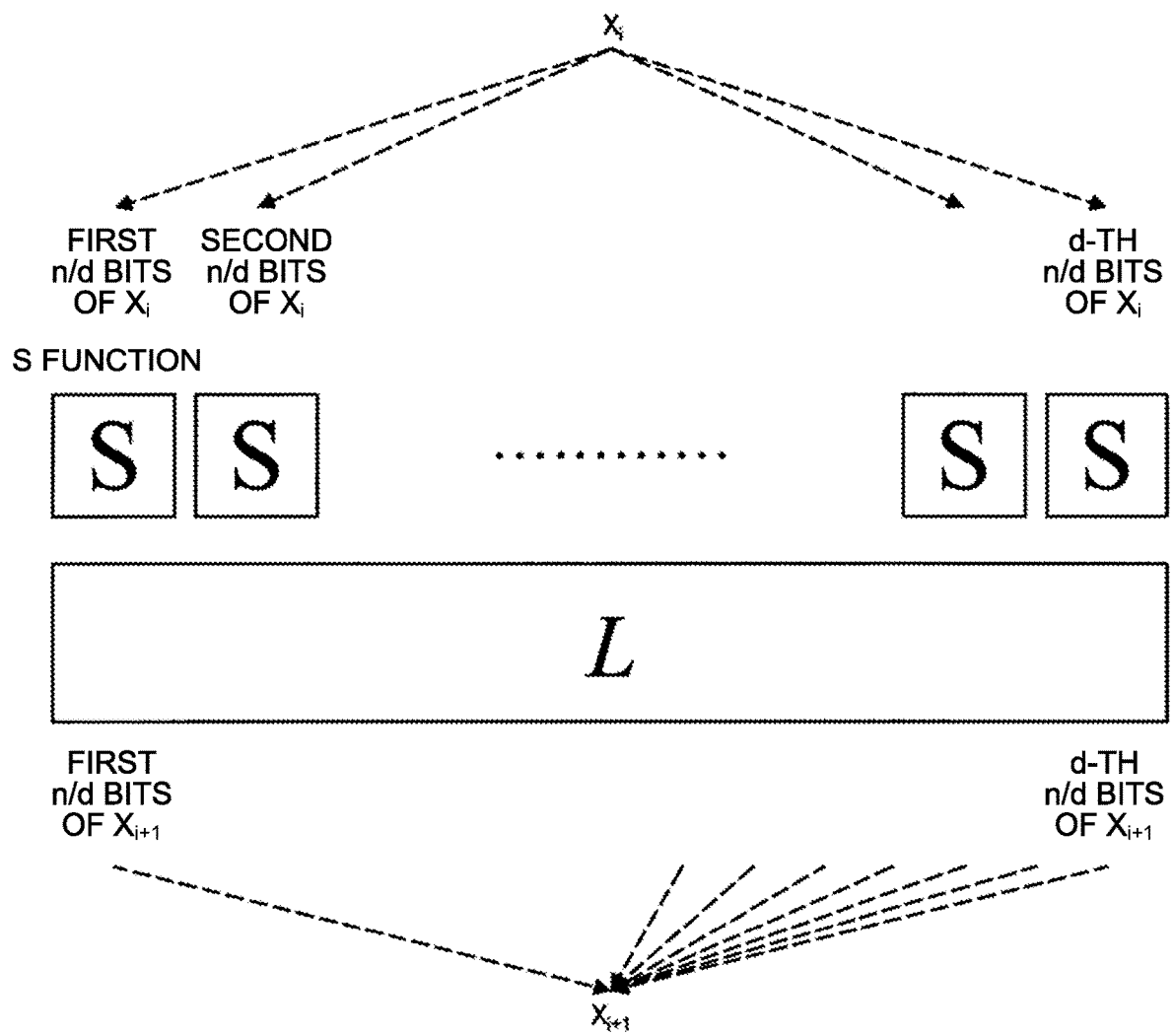
FIG. 18 is a schematic diagram illustrating the specific example (C).

FIG. 18 is a schematic diagram illustrating the specific example (C), and illustrates a configuration example using the SPN structure. In the example illustrated in FIG. 18, the n-bit input data Xi is divided into d sorts of data, and the size of the data in each line is n/d [bit]. In this case, an arithmetic operation (non-linear transformation operation S-layer (Substitution-layer)) is performed using the S function with input/output of n/d [bit] for each piece of data. Thereafter, n-bit input/output linear transformation is performed as an arithmetic operation (linear transformation P-layer (Permutation-layer)) using the L function. In this case, the S function and the L function (input/output linear transformation L) are bijective functions, and the L function includes a round constant operation. The S function is configured based on the internal block cipher E', but needs to be the bijective function, so that the S function cannot be configured by transformation performed by fixing the input bits and disregarding part of the outputs for the internal block cipher E' as illustrated in FIG. 11. Thus, a block cipher of n/d [bit] needs to be used. Accordingly, a condition for the block size n' of the internal block cipher E' is n'=n/d (condition 2).

Figure 19:
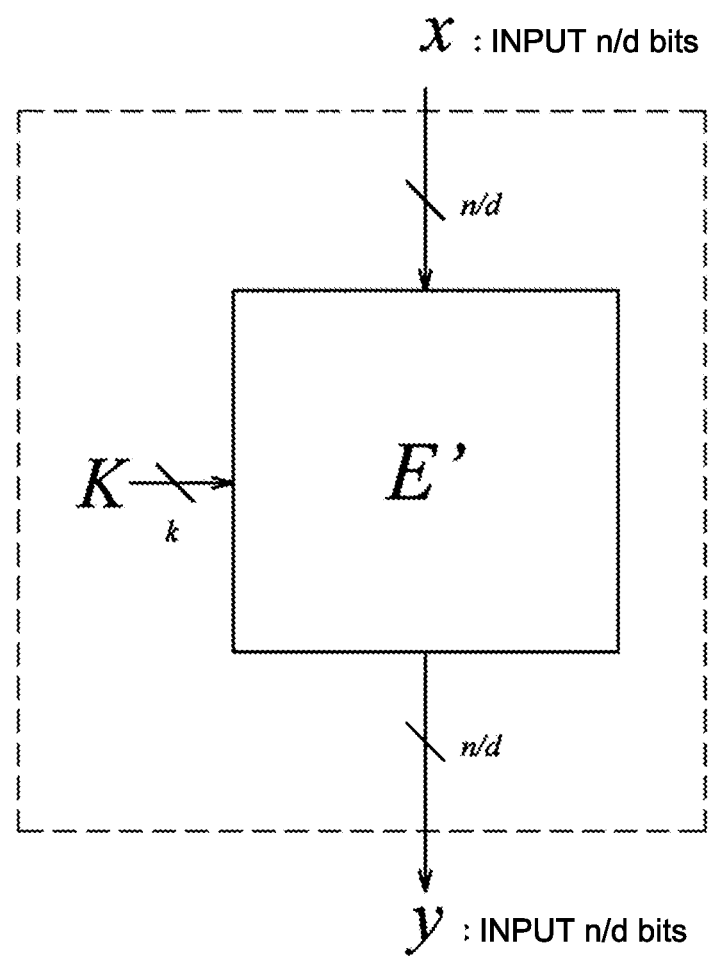
FIG. 19 is a schematic diagram illustrating a configuration of each of S functions illustrated in FIG. 18.

FIG. 19 is a schematic diagram illustrating a configuration of each of the S functions illustrated in FIG. 18. As illustrated in FIG. 19, the size of input/output of the internal block cipher E' constituting the S function is n/d [bit]. Thus, for example, in a case of 8-bit input/output, a table in which the input value (0 to 255) is associated with the output value is generated, and the arithmetic operation of the S function is performed with this table. The L function for performing a linear transformation operation is constituted of a square matrix, for example. In a case in which the input/output of the S function is 8 bits, the 8-bit output from the S function is input to the L function, a square matrix of 8×8 matrix is multiplied by an 8-bit value, and an 8-bit value is output from the L function. In this way, the L function has a function of diffusing the output value from the S function.

FIG. 20 is a schematic diagram illustrating a specific configuration example, and illustrates a case in which n=128 and d=8. The S function is implemented as a table in the white-box implementation. The table size in FIG. 20 is about 256 [byte]. Also in a case of the S function, similarly to the case of the F function illustrated in FIG. 11, a constant specific to the round can be XORed to the output of the S function to change each S function. Due to this, the S function itself can be shared, so that a memory region for storing the table can be largely reduced.

3.3. Specific Example (D)

Figure 21:
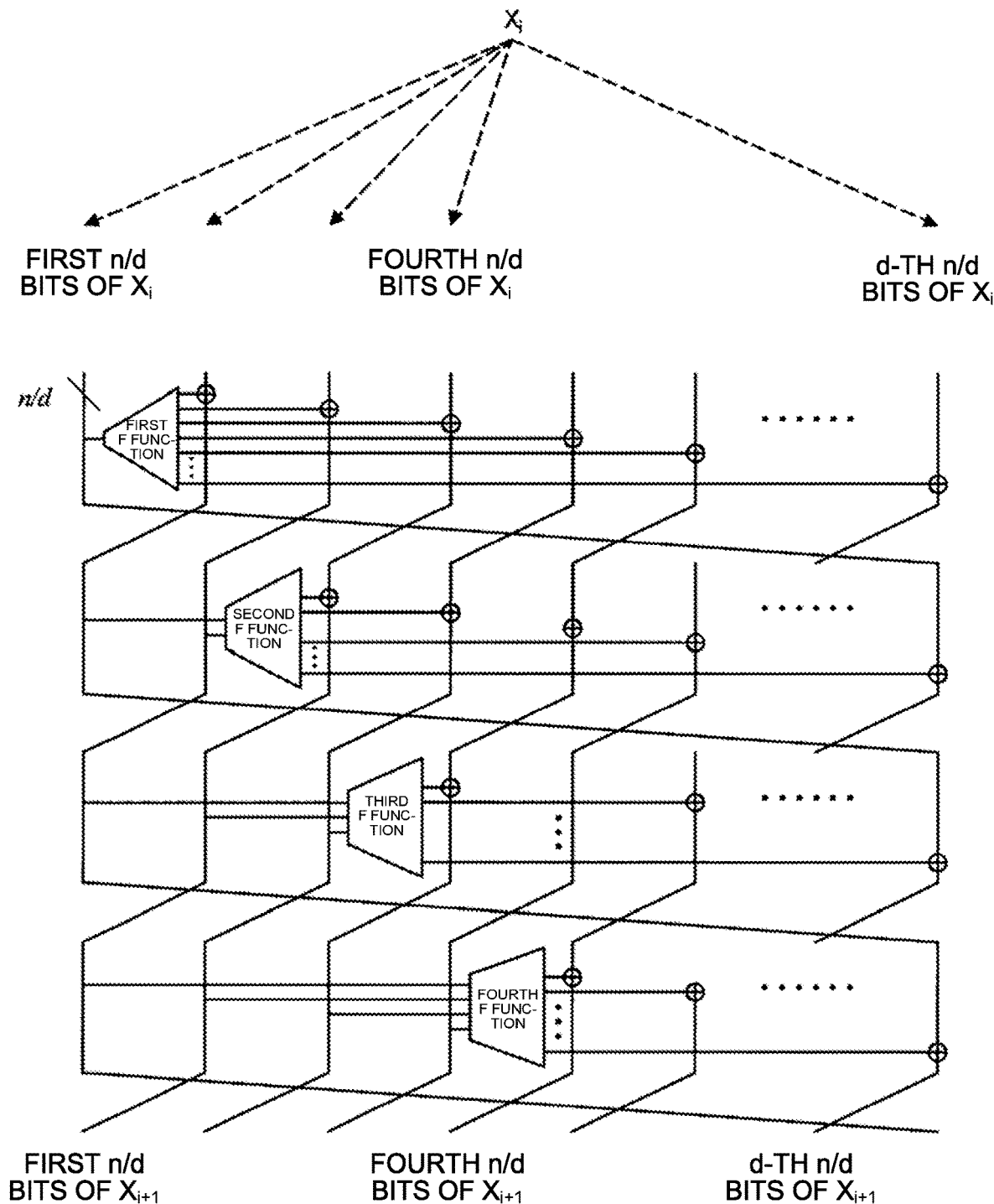
FIG. 21 is a schematic diagram illustrating the specific example (D).

FIG. 21 is a schematic diagram illustrating the specific example (D), and illustrates a configuration example using a modified Feistel structure. In the example illustrated in FIG. 21, the n-bit input data is divided into d sorts of data, and the size of the data in each line is n/d, and the data is constituted of four types of F functions having different sizes. The F function with the input of n/d [bit] and the output of (n−n/d) [bit] is used in the first round, the F function with the input of 2n/d [bit] and the output of (n−2n/d) [bit] is used in the second round, the F function with the input of 3n/d [bit] and the output of (n−3n/d) [bit] is used in the third round, and the F function with the input of 4n/d [bit] and the output of (n−4n/d) [bit] is used in the fourth round. These four rounds are bases, and optional rounds are repeated. Similarly to the method illustrated in FIG. 11, the F function having an optional size is generated from the internal block cipher E', and the round constant is XORed to the output.

In the white-box implementation, part or all of the functions are implemented as a table in accordance with a code (table size) desired by the user. In a case in which n=128 and d=16, the table size of the F function in each round is as follows: about 3.84 [byte] in the first round, 918 [Kbyte] in the second round, 218 [Mbyte] in the third round, and 51.5 [Gbyte] in the fourth round. By selecting the F function to be implemented as a table in accordance with a demand of the user, the entire code size can be adjusted. For example, by performing function operation each time without tabulating the fourth round function, the entire code size can be suppressed.

3.4. Specific Example (E)

Figure 22:
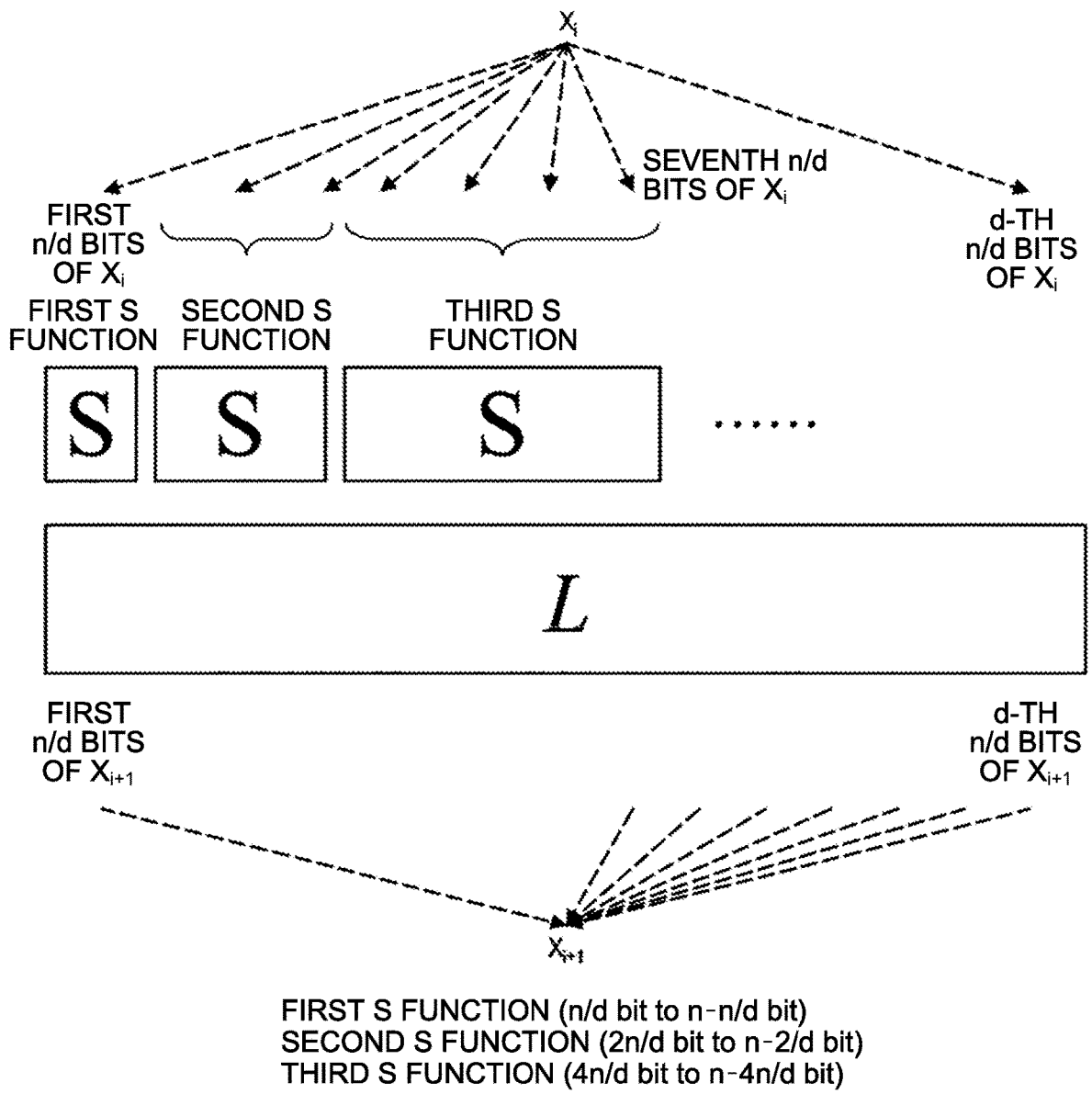
FIG. 22 is a schematic diagram illustrating the specific example (E).

FIG. 22 is a schematic diagram illustrating the specific example (E), and illustrates a configuration example using a modified SPN structure. In the example illustrated in FIG. 22, the n-bit input data is divided into d sorts of data, the size of the data in each line is n/d, and the data is constituted of three types of S functions having different sizes. As S-layers in respective rounds, the S function with input/output of n/d [bit], input/output of 2n/d [bit], and input/output of 4n/d [bit] are used. In the white-box implementation, part or all of the functions are implemented as a table in accordance with a code (table size) desired by the user. For example, it is assumed that pieces of data of 8 [bit], 16 [bit], and 32 [bit] are implemented where n=128 and d=8. The respective table sizes are 256 [byte], 132 [Kbyte], and 17.2 [Gbyte]. By selecting the S function to be implemented as a table in accordance with a demand of the user, the entire code size can be adjusted.

According to the embodiment, in the white-box model, security against key extraction is concluded to be security against a key recovery problem in the black-box model of the internal block cipher E'. This is because the internal block cipher E' is implemented as a table in the white-box implementation, and the attacker can access only the input/output of the table even in the white model. This matches with the black-box model of the internal block cipher E'. By using a cipher having high reliability (for example, the AES) for an internal state (internal block cipher E'), the white-box model can also have security equivalent to that of key recovery in the black-box model of the internal block cipher E'.

Additionally, the attacker cannot reduce the table size unless knowing a key (Space-hardness). The attacker cannot calculate E' without using a table operation unless knowing information of the key of the internal block cipher E'. Thus, the given table cannot be converted into a smaller table. This means that, when the attacker makes a code lifting attack, large-volume data is required. A time required for extracting the code is increased in proportion to the data size, so that code lifting work takes a long time. Additionally, if the entire code is taken, the size thereof cannot be compressed and large-volume data is required to be sent in distributing the code, so that a risk of distribution can be reduced.

Regarding external encoding, the security can be guaranteed without external encoding.

Furthermore, tables of various sizes corresponding to implementation requirements can be configured. According to the specific example (B) and the specific example (C), an algorithm of an optional table size can be configured by changing the value of the number of divisions d. According to the specific example (D) and the specific example (E), a plurality of table sizes can be implemented with the same algorithm by appropriately selecting a plurality of values of the number of divisions d, or sizes of the F functions and the S functions to be used.

The user can freely select the internal block cipher E'. The internal block cipher E' can be freely selected as long as the condition for the input/output size (the condition 1, the condition 2) is satisfied. In a case of being used in the black box, table implementation is not required, and an internal arithmetic operation can be directly performed. In this case, it is possible to meet various implementation needs by appropriately selecting the internal block cipher E'. For example, by using the AES as the internal block cipher E' and using AES-NI, the internal block cipher E' can be implemented as software very rapidly, and can be implemented to be secure against a cache timing attack. By using Piccolo or Pride as software and a lightweight cipher, the internal block cipher E' can be implemented even in an environment in which implementation constraint such as a RAM size is large.

4. Regarding Effect Obtained by Encryption Related to White-Box Model

Figure 23:
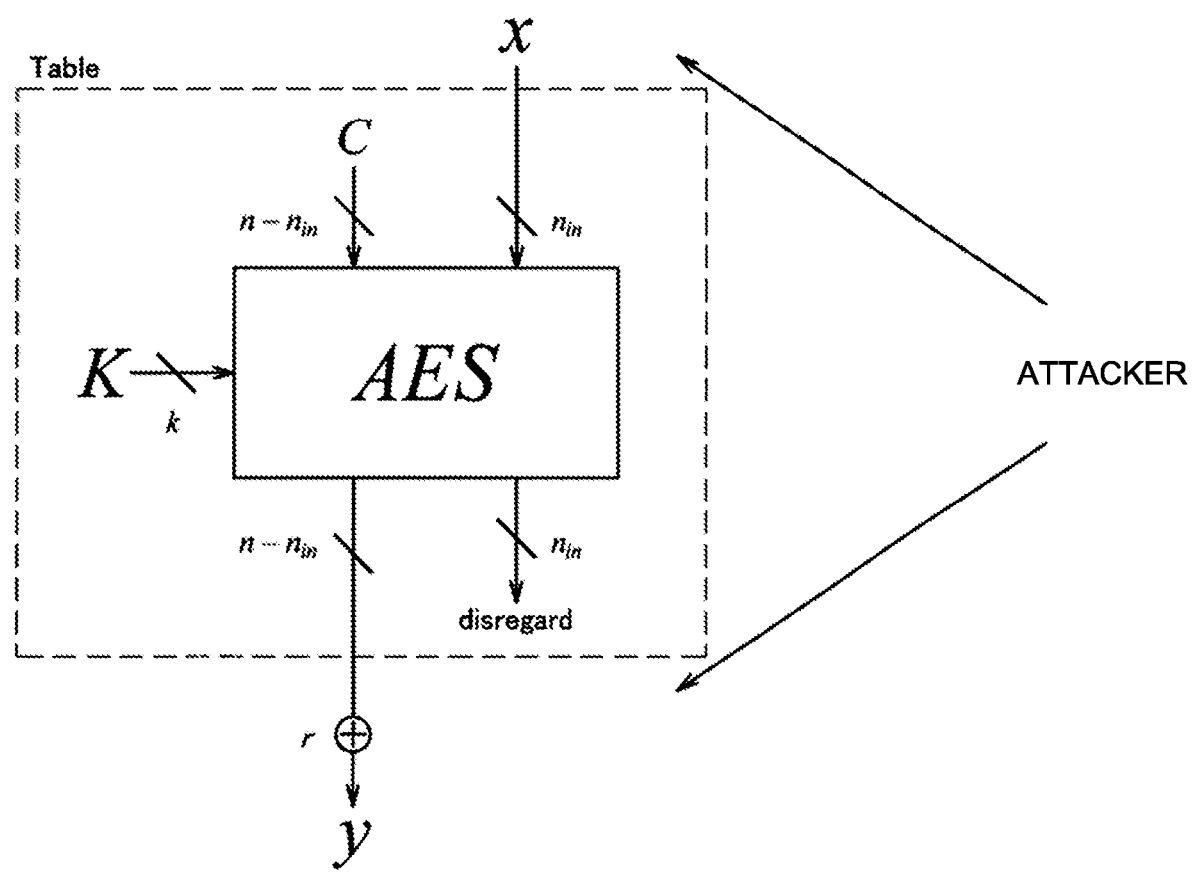
FIG. 23 is a schematic diagram for explaining security obtained by encryption according to the embodiment.

FIG. 23 is a schematic diagram for explaining the security obtained by white-box model encryption according to the embodiment, and illustrates an example in which the F function based on the Feistel structure illustrated in FIG. 11 is configured with the AES. As described above, in the white-box model, the attacker can access the input/output of the table. The problem that the key is obtained from the same table as that in the black-box model of the internal block cipher E' (white-box model) is equivalent to a key recovery attack of the AES (black-box model). Thus, by performing encryption according to the embodiment, the security equivalent to that for the key recovery attack of the AES (black-box model) can be ensured. In the white-box model, the security is concluded to be the security against a key recovery problem in the black-box model of the internal block cipher E'. The attacker cannot reduce the table size unless knowing the key (Space-hardness).

Figure 24:
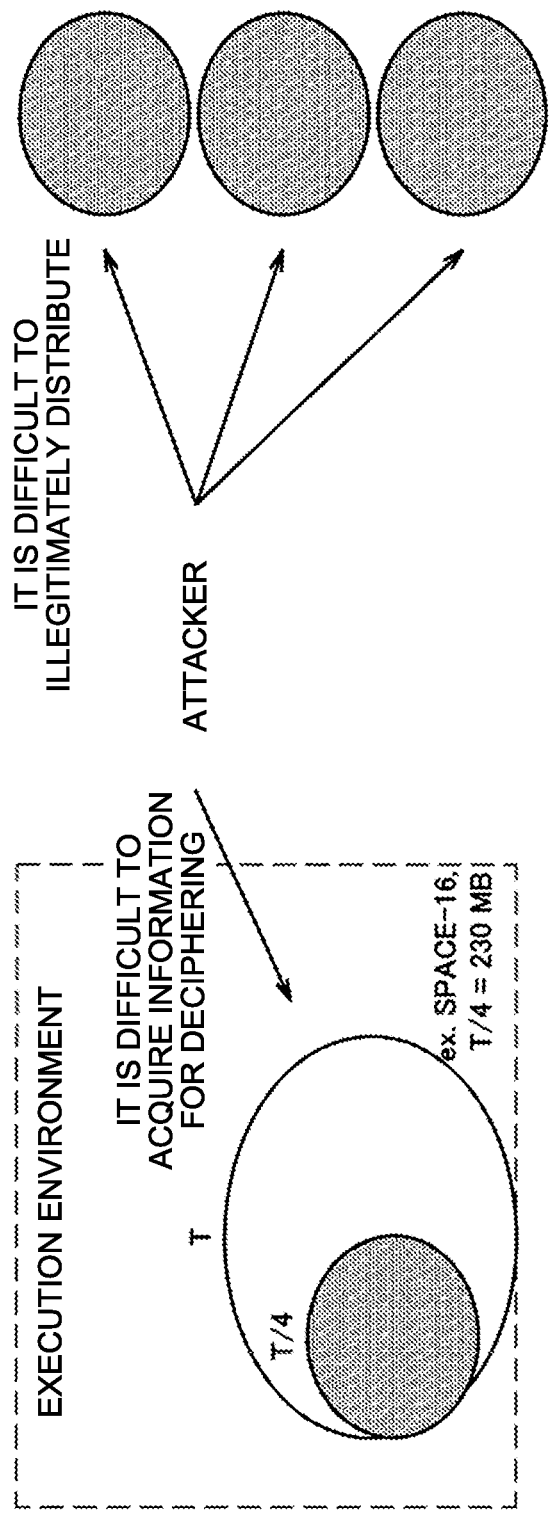
FIG. 24 is a schematic diagram for explaining security obtained by encryption according to the embodiment.

FIG. 24 is a schematic diagram for explaining the security obtained by encryption according to the embodiment, and illustrates a data amount that is required at the time when the attacker makes an attack. For the attack, the secret key K cannot be acquired unless obtaining a very large amount of data. Specifically, the data amount needs to be $10^{4.4}$ to $10^{10.5}$ times larger than that for a 128-bit key. Even if the attacker can obtain the data, the data cannot be compressed, so that large-volume data can be a deterrent against illegitimate distribution.

According to the embodiment, tables of various sizes corresponding to implementation requirements can be configured. With the configurations of the specific examples (B) and (C), an algorithm of an optional table size can be configured by changing the number of divisions d. With the configurations of the specific examples (D) and (E), a plurality of table sizes can be implemented with the same algorithm by appropriately selecting a plurality of values of the number of divisions d, or sizes of the F functions and the S functions to be used. Furthermore, the user can freely select an internal arithmetic operation for the table, and can select an optimum internal arithmetic operation for the black-box implementation.

5. Configuration that is Secure in Gray-Box Model

In the embodiment, the configuration of the block cipher that is secure in the white-box model described above is partially changed to be secure in a gray-box model. In the gray-box model, the attacker cannot obtain the intermediate value of the arithmetic operation as in the white-box model, but can obtain side channel information. Examples of the side channel information include information of electric power, information of timing of an arithmetic operation, information obtained by probing a chip, and information obtained at the time when a malfunction is caused by inputting strong electromagnetic waves and the like during an encryption operation. Each of these pieces of side channel information is not the intermediate value itself of the arithmetic operation, but can be utilized by the attacker for predicting the intermediate value.

Figure 25:
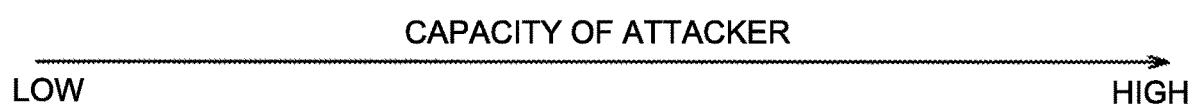
FIG. 25 is a schematic diagram illustrating a characteristic of a gray-box model with respect to the black-box model and the white-box model.

FIG. 25 is a schematic diagram illustrating a characteristic of the gray-box model with respect to the black-box model and the white-box model. In all of the black-box model, the gray-box model, and the white-box model, the attacker can see an input value and an output value. The attacker cannot see the intermediate value of encryption in the black-box model, but the attacker can see the intermediate value of encryption in the white-box model. In the gray-box model, the attacker can predict the intermediate value from the side channel information as described above. Thus, in the gray-box model, the attacker can partially see the intermediate value. Accordingly, as illustrated in FIG. 25, the capacity of the attacker is the highest in the white-box model, and is lowered in the gray-box model and the black-box model in this order.

In the gray-box model, the capacity of the attacker is lower than that in the white-box model, and the block cipher described above is not secure, so that the table may be restored by a side channel attack in the gray-box model. When the table is restored, the ciphertext is restored although the cryptographic key is not found. Thus, the security in the gray-box model is required to be maintained while maintaining the security in the white-box model.

Figure 26:
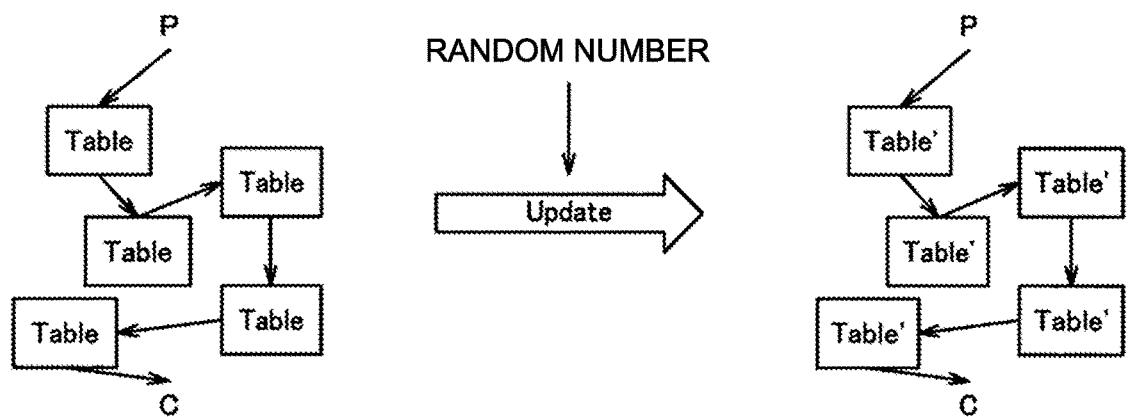
FIG. 26 is a schematic diagram illustrating an outline for generating a block cipher that is secure in the gray-box model from a block cipher that is secure in the white-box model.

Thus, in the embodiment, a cipher that is secure against the side channel attack (a cipher that is secure in the gray-box model) is generated from the block cipher that is secure in the white-box model described above. FIG. 26 is a schematic diagram illustrating an outline for generating the block cipher that is secure in the gray-box model from the block cipher that is secure in the white-box model. As illustrated in FIG. 26, the block cipher that is secure in the gray-box model is generated by dynamically updating the table using a random number that cannot be used in the white-box model but can be used in the gray-box model. Due to this, it is possible to prevent the attacker in the gray-box model who aims to acquire the table from acquiring the table.

Figure 27:
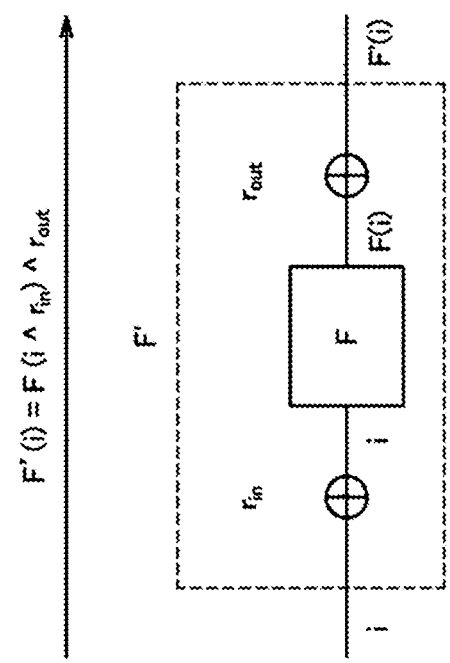
FIG. 27 is a schematic diagram illustrating a method of updating a table.

FIG. 27 is a schematic diagram illustrating a method of updating a table. FIG. 27 illustrates one F function (table). An input size of data to the F function is assumed to be $n_{in}$, and an output size of data from the F function is assumed to be $n_{out}$. At the time of updating the table, a random number $r_{out}$ of $n_{out}$ bits is generated, and a random number $r_{in}$ of $n_{in}$ bits is selected. An exclusive OR of the input and the random number $r_{in}$ is taken, and a result thereof is input to the F function. Additionally, an exclusive OR of the output from the F function and the random number $r_{out}$ is taken, and a result thereof is output. Due to this, the F function (F(i)) is updated to be F'(i) as follows.

$$F'(i) = F(i \char`\^ r_{in}) \char`\^ r_{out}$$

Figure 28:
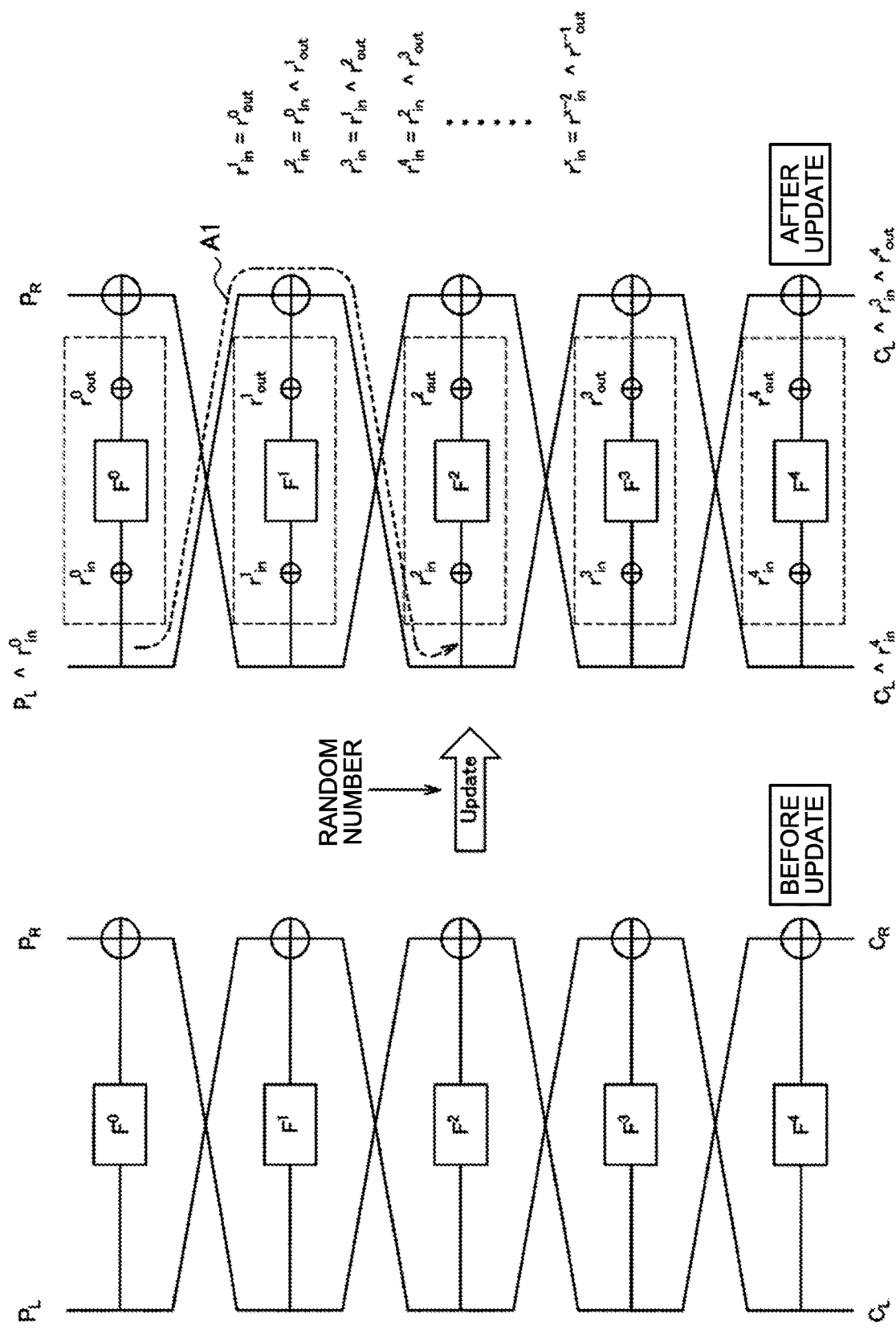
FIG. 28 is a schematic diagram illustrating an example of updating the F function with a random number in the basic configuration example of the Feistel structure illustrated in FIG. 3.

In this case, even if the F function (table) is updated, a function of the entire function needs to be maintained. Due to this, the random number $r_{in}$ is selected so that the random number $r_{out}$ is canceled. FIG. 28 is a schematic diagram illustrating an example of updating the F function with a random number in the basic configuration example of the Feistel structure illustrated in FIG. 3. In the Feistel structure after the update, an exclusive OR of the input of each F function and a random number $r^x_{in}$ is operated, and an exclusive OR of the output of each F function and a random number $r^x_{out}$ is operated. In this case, the round number is x+1.

As described above, the exclusive OR of the output of each F function and the random number $r^x_{out}$ is operated. On the other hand, a value of the random number $r_{in}$ on an input side is adjusted to cause the Feistel structure before the update illustrated in the left drawing of FIG. 28 to be equivalent to the Feistel structure after the update illustrated in the right drawing thereof. As a precondition, of pieces of data $P_L$ and $P_R$ obtained by dividing the plaintext P into two pieces, an exclusive OR of $P_L$ and the random number $r^0_{in}$ is operated. Among random numbers on the input side, only $r^0_{in}$ cannot be obtained by adjustment, and is an optional random number similar to the random number $r^x_{out}$ on the output side.

In FIG. 28, random numbers $r^1_{in}, r^2_{in}, r^3_{in}, r^4_{in}, \ldots$, and $r^x_{in}$ on the input side are calculated as follows.

$$r^1_{in} = r^0_{out}$$
$$r^2_{in} = r^0_{in} \wedge r^1_{out}$$
$$r^3_{in} = r^1_{in} \wedge r^2_{out}$$
$$r^4_{in} = r^2_{in} \wedge r^3_{out}$$
$$\ldots$$
$$r^x_{in} = r^{x-2}_{in} \wedge r^{x-1}_{out}$$

For example, in a case of adjusting a value of $r^1_{in}$ in the Feistel structure after the update in FIG. 28, the input to each F function needs to match with the input to each F function in the Feistel structure before the update. In the Feistel structure after the update, an exclusive OR of $P_L$ and the random number $r^0{}_{in}$ is operated, and when the exclusive OR is repeatedly operated two times, the data is returned to be original data. Accordingly, when the exclusive OR of $P_L$ and $r^0{}_{in}$ is operated again before being input to an F0 function, an input to the F0 function matches with that in the Feistel structure before the update. Similarly, in the Feistel structure after the update, regarding an input to an F1 function, $r^0{}_{out}$ is exclusive-ORed to the output from the F0 function and an input $P_R$ thereto, so that, when $r^0{}_{out}$ is exclusive-ORed thereto again before being input to the F1 function, the input to the F0 function matches with that in the Feistel structure before the update. Thus, $r^1{}_{in} = r^0{}_{out}$ is satisfied.

Similarly, regarding an input to an F2 function in the Feistel structure after the update, it can be found that data is masked with $r^0{}_{in}$ and $r^1{}_{out}$ in a data flow before $r^2{}_{in}$ is exclusive-ORed (indicated by the arrow A1 in FIG. 28) as compared with a data flow in the Feistel structure before the update. The data is returned to be the original data when the exclusive OR is repeatedly operated two times, so that, when the exclusive OR of the data to be input to the F2 function and $r^2{}_{in}$ is taken assuming that $r^2{}_{in} = r^0{}_{in} \wedge r^1{}_{out}$ the data matches with the input to the F2 function in the Feistel structure before the update.

In this way, the random numbers $r^1{}_{in}, r^2{}_{in}, r^3{}_{in}, r^4{}_{in}, \ldots$ and $r^x{}_{in}$ as described above can be calculated.

As illustrated in FIG. 28, final output values in the Feistel structure after the update are $C_L \wedge r^4{}_{in}$ and $C_R \wedge r^3{}_{in} \wedge r^4{}_{out}$, a mask $r^4{}_{in}$ is applied to a final output value $C_L$ in the Feistel structure before the update, and a mask $r^3{}_{in} \wedge r^4{}_{out}$ is applied to $C_R$. Due to this, by eliminating these masks, the same output values $C_L$ and $C_R$ as those in the Feistel structure before the update can be obtained.

Figure 29:
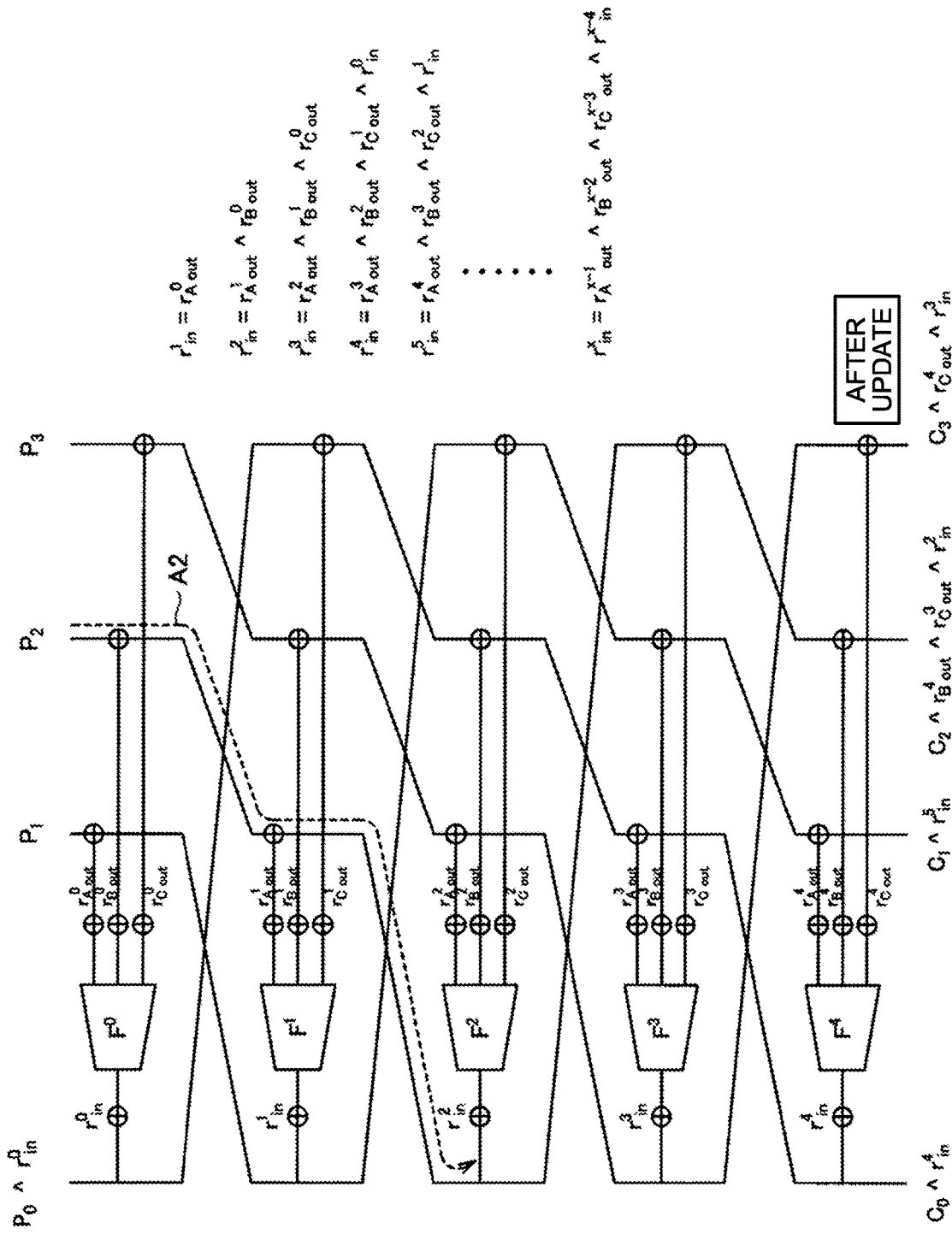
FIG. 29 is a schematic diagram illustrating an example of updating the F function with a random number in the specific configuration example illustrated in FIG. 15.

FIG. 29 is a schematic diagram illustrating an example of updating the F function with a random number in the specific configuration example illustrated in FIG. 15. The update method is the same as that in the example of FIG. 28. Also in FIG. 29, by adjusting the random numbers $r^1{}_{in}, r^2{}_{in}, r^3{}_{in}, r^4{}_{in}, \ldots$ and $r^x{}_{in}$ on the input side with respect to random numbers $r_B{}^0{}_{out}, r_B{}^0{}_{out}, r_C{}^0{}_{out}, r_A{}^1{}_{out}, r_B{}^1{}_{out}, r_C{}^1{}_{out}, \ldots$ on the output side of the F function, the configuration is enabled to be equivalent to the configuration in FIG. 15 before being updated with a random number.

For example, regarding the input to the F2 function in the configuration of FIG. 29, it can be found that the data is masked with $r_B{}^0{}_{out}$ and $r_A{}^1{}_{out}$ in a data flow before $r^2{}_{in}$ is exclusive-ORed (indicated by the arrow A2 in FIG. 29) as compared with the data flow in FIG. 15 that is not updated with a random number. The data is returned to be the original data when the exclusive OR is repeatedly operated two times, so that, when the exclusive OR of the data to be input to the F2 function and $r^2{}_{in}$ is taken assuming that $r^2{}_{in} = r_A{}^1{}_{out} \wedge r_B{}^0{}_{out}$, the data matches with the input to the F2 function in the configuration of FIG. 15 before the update. The random numbers $r^1{}_{in}, r^2{}_{in}, r^3{}_{in}, r^4{}_{in}, \ldots$ and $r^x{}_{in}$ on the input side of another F function are obtained as follows using the same method.

$$r^1{}_{in} = r_A{}^0{}_{out}$$

$$r^2{}_{in} = r_A{}^1{}_{out} \wedge r_B{}^0{}_{out}$$

$$r^3{}_{in} = r_A{}^2{}_{out} \wedge r_B{}^1{}_{out} \wedge r_C{}^0{}_{out}$$

$$r^4{}_{in} = r_A{}^3{}_{out} \wedge r_B{}^2{}_{out} \wedge r_C{}^1{}_{out} \wedge r^0{}_{in}$$

$$r^5{}_{in} = r_A{}^4{}_{out} \wedge r_B{}^3{}_{out} \wedge r_C{}^2{}_{out} \wedge r^1{}_{in}$$

$$r^x{}_{in} = r_A{}^{x-1}{}_{out} \wedge r_B{}^{x-2}{}_{out} \wedge r_C{}^{x-3}{}_{out} \wedge r^{x-4}{}_{in}$$

Also in FIG. 29, a mask is applied to the final output value after the F function is updated with a random number, but the same output value as that in the configuration before the update can be obtained by eliminating the mask.

Figure 30:
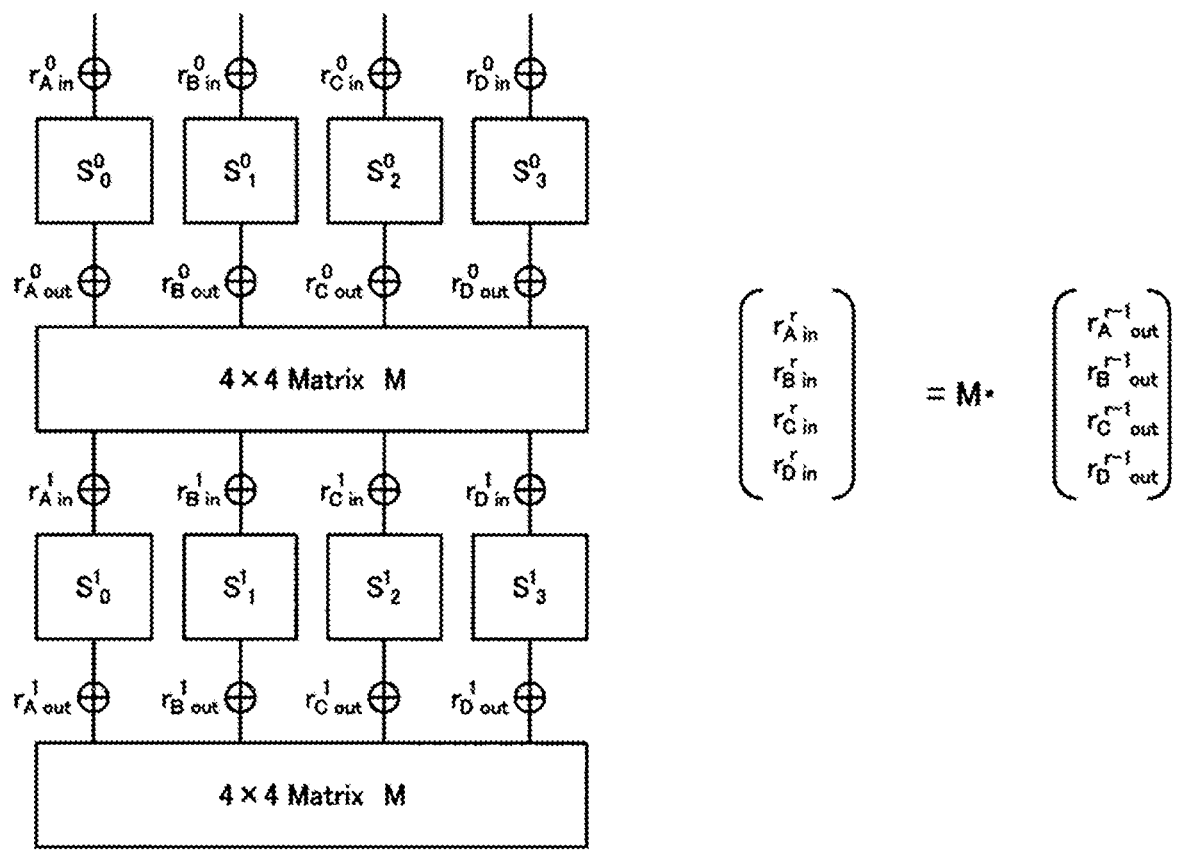
FIG. 30 is a schematic diagram illustrating an example of updating the S function with a random number in the configuration example using the SPN structure as illustrated in FIG. 20.

FIG. 30 is a schematic diagram illustrating an example of updating the S function with a random number in the configuration example using the SPN structure as illustrated in FIG. 20. A random number is exclusive-ORed to the front and the rear of each S function. In this case, the following relation is established between random numbers $r_A{}^{r-1}{}_{out}$, $r_B{}^{r-1}{}_{out}$, $R_C{}^{r-1}{}_{out}$ and $r_D{}^{r-1}{}_{out}$ on the output side of the S function in the (r−1)-th round and random numbers $r_A{}^r{}_{in}$, $r_B{}^r{}_{in}$, $r_C{}^r{}_{in}$, and $r_D{}^r{}_{in}$ on the input side of the S function in the r-th round. In FIG. 30, the L function in FIG. 20 is denoted by a sign M. Due to this, the random numbers $r_A{}^{r-1}{}_{out}$, $r_B{}^{r-1}{}_{out}$, $R_C{}^{r-1}{}_{out}$, and $r_D{}^{r-1}{}_{out}$ on the output side of the S function in the (r−1)-th round can be cancelled by the random numbers $r_A{}^r{}_{in}$, $r_B{}^r{}_{in}$, $r_C{}^n{}_{in}$, and $r_D{}^r{}_{in}$ on the input side of the S function in the r-th round.

$$\begin{pmatrix} r_A{}^r{}_{in} \\ r_B{}^r{}_{in} \\ r_C{}^r{}_{in} \\ r_D{}^r{}_{in} \end{pmatrix} = M \cdot \begin{pmatrix} r_A{}^{r-1}{}_{out} \\ r_B{}^{r-1}{}_{out} \\ r_C{}^{r-1}{}_{out} \\ r_D{}^{r-1}{}_{out} \end{pmatrix} \quad \text{Expression 1}$$

Next, the following describes security of the function (table) that is updated by the method described above. In the F function illustrated in FIG. 27, the F function before the update is assumed to be a pseudo-random function, and $r^i{}_{in}$ and $r^i{}_{out}$ in the i-th round are assumed to be random numbers. The pseudo-random function is a function with which, even if the attacker can access an input/output of both of a true random function and the pseudo-random function, the attacker cannot discriminate therebetween.

In FIG. 27, the updated F'(i) is also a pseudo-random function. The information of $r^i{}_{in}$ and $r^i{}_{out}$ is not leaked from the updated F'(i). Additionally, the information of the F function before the update is not leaked from the updated F'(i). Thus, a random function (table) can be generated at each update.

Next, the following describes an update timing. The function may be updated with a random number every time the data is input, but to reduce the processing load, a frequency of update is preferably lowered in a range in which the attacker cannot recover the table.

In this case, to recover X sorts of tables by the attacker, at least X times of encryption operations are required. The block cipher that is secure in the white-box model is secure even when the attacker acquires ¼ or less of table entries. Thus, assuming that the number of entries of the table is $2^n$, it is sufficient that the table is updated per execution of $2^{n-2}$. Due to this, the security can be reliably maintained although ¼ or less of the table may be acquired by the attacker.

6. Configuration Example for Decryption

As described above, the decryption algorithm D corresponding to the encryption algorithm E can be defined as the inverse function $E^{-1}$ of the encryption algorithm E, receives the ciphertext C and the key K as an input, and outputs the plaintext P. Also in the decryption algorithm D, the security equivalent to that of the black-box model can be ensured by configuring the table by black-box implementation.

7. Difference from Existing Technique

The following describes differences between the technique according to the embodiment and the methods disclosed in Non Patent Literatures 1 and 2 described above (referred to as a first existing technique), the method disclosed in Non Patent Literatures 3 and 4 (referred to as a second existing technique).

With a first existing technique, only part of the dependence between the intermediate value and power consumption can be eliminated, so that security that is provable for a pre-assumed specific attack (d-th order attack) such as $1^{st}$ and $2^{nd}$ order attacks can be achieved, but security against an attack other than the specific attack (d+1-th order attack) such as a $3^{rd}$ order attack cannot be ensured. That is, the first existing technique is merely a countermeasure technique against a limited attack.

With the first existing technique, the processing load is largely increased because masking processing is performed, so that there is the problem that a processing speed is reduced and implementation performance is largely deteriorated. The first existing technique has the problem that the processing speed becomes about several tens of times to several thousands of times lower than that of the AES as a typical encryption technique.

With the second existing technique, the attacker cannot acquire the cryptographic key, but the security cannot be maintained in a case in which the attacker acquires information of a table that is substantially equivalent to the cryptographic key.

On the other hand, with the method of updating an encryption function with a random number according to the embodiment, resistance can be ensured against all attacks including a side channel attack. Additionally, regarding the processing load, the method can be basically configured by adding a random number to the encryption function, so that the method can be implemented with a processing load that is largely lower than that of the first existing technique.

8. Example of Application to which Embodiment is Applied

The technique according to the embodiment can implement confidentiality of data in a communication channel as illustrated in FIG. 1, and can be applied to various applications. The following describes some examples of the application.

Figure 31:
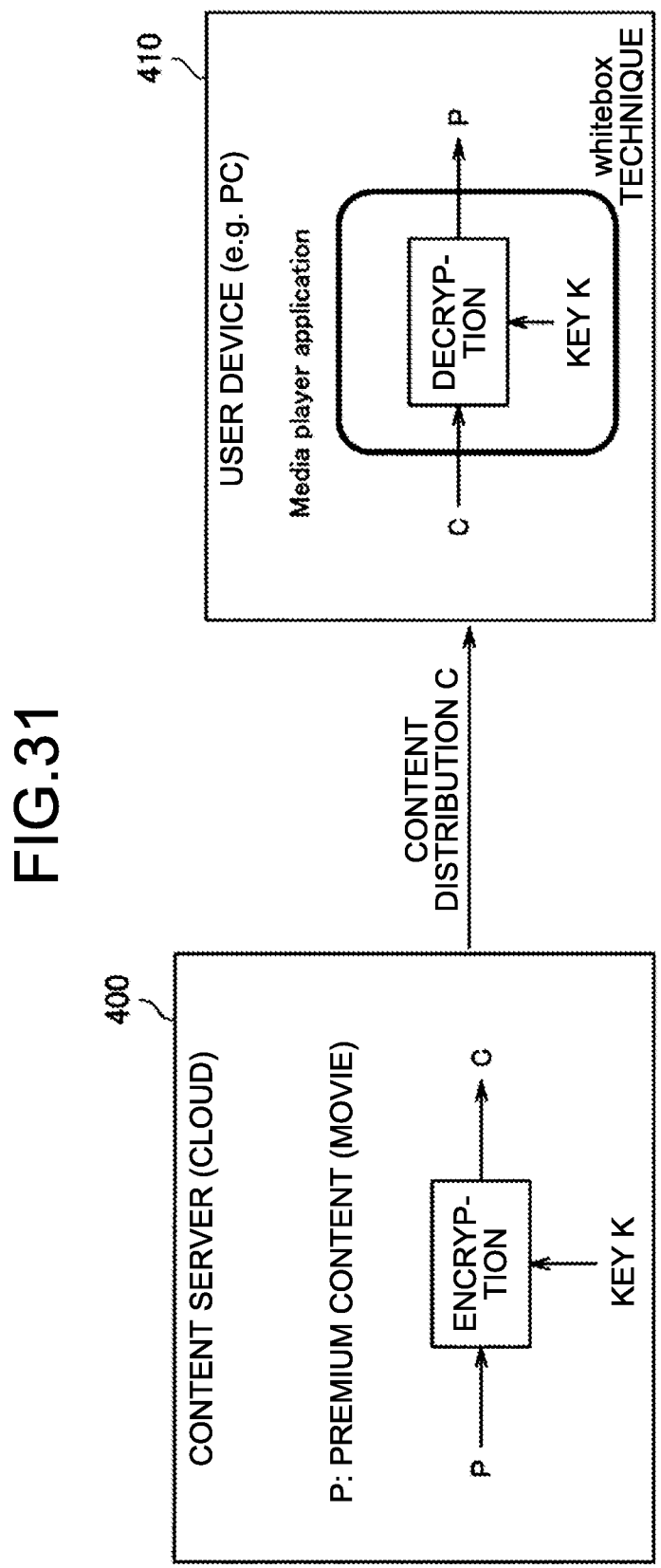
FIG. 31 is a schematic diagram illustrating an application example for Digital Rights Management (DRM).

FIG. 31 is a schematic diagram illustrating an application example for Digital Rights Management (DRM). As illustrated in FIG. 31, encryption is performed in a content server 400 on a cloud, and content (ciphertext C) is distributed to a user device 410 from the content server 400. The user device 410 is an electronic appliance such as a personal computer (PC) and a smartphone. The content (ciphertext C) is decrypted in the user device 410.

Figure 32:
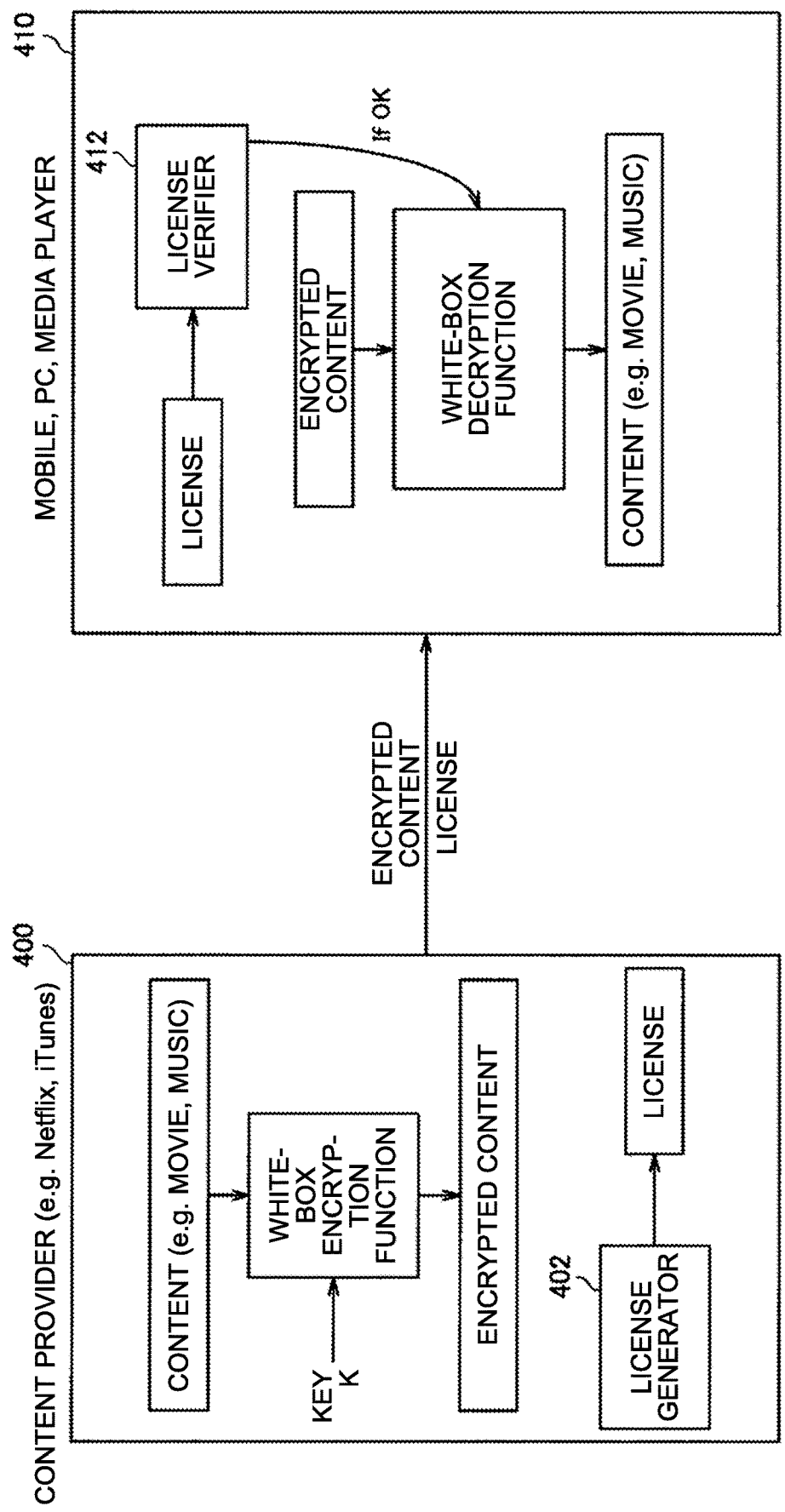
FIG. 32 is a schematic diagram illustrating FIG. 31 in more detail.

FIG. 32 is a schematic diagram illustrating FIG. 31 in more detail. The content server 400 encrypts content such as movies and music with a white box encryption function. In the content server 400, a license is generated by a license generator 402 to be transmitted to the user device 410 together with the encrypted content. The user device 410 verifies the transmitted license with a license verifier 412, and if the license is successfully verified, the user device 410 decrypts the encrypted content with a white-box decryption function.

In the Digital Rights Management as illustrated in FIG. 31 and FIG. 32, the content needs to be decrypted by the user device 410. In this case, if the key K is exposed, the content may be illegitimately distributed. That is, in an environment in which encryption is not secure, the user device 410 becomes an unreliable environment. According to the embodiment, it is possible to more securely prevent the secret key K of the content from being acquired by a malicious user with the white box encryption technique.

Figure 33:
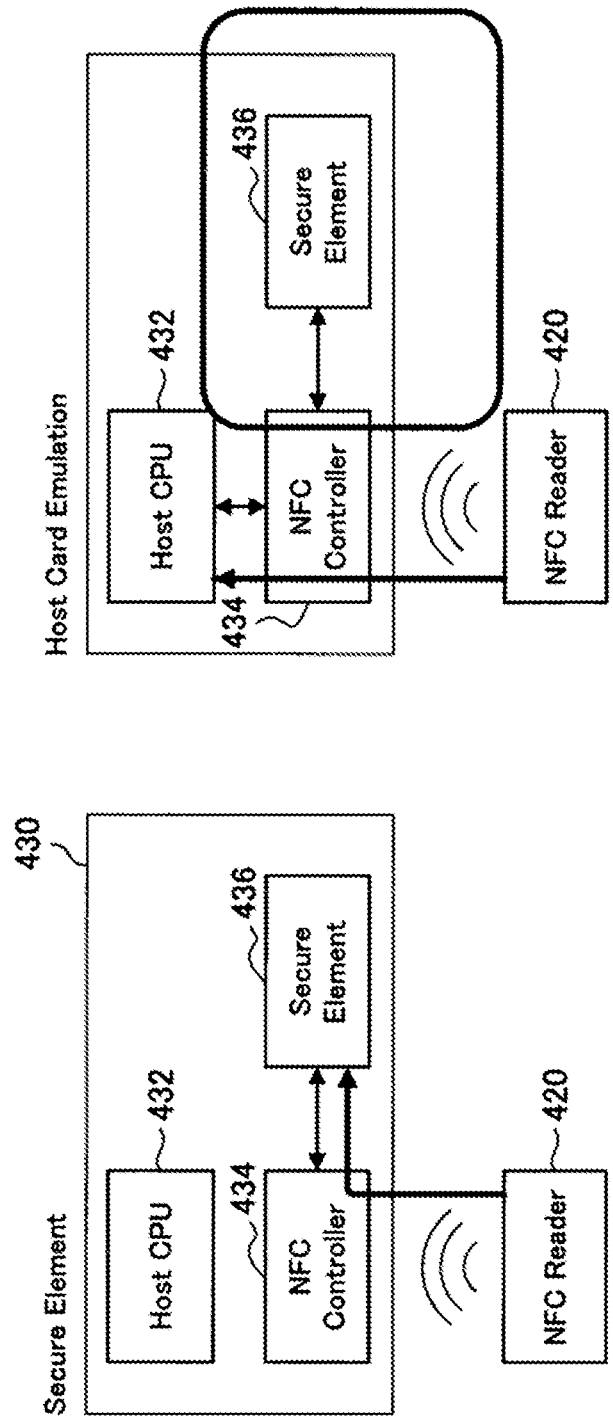
FIG. 33 is a schematic diagram illustrating an application example for a payment system utilizing emulation of NFC.

FIG. 33 is a schematic diagram illustrating an application example for a payment system utilizing emulation of NFC. As illustrated in FIG. 33, in this system, emulation is performed while bringing a user device 430 closer to a reading device 420 of NFC. The user device 430 includes a host CPU 432, an NFC controller 434, and a secure element 436.

Figure 34:
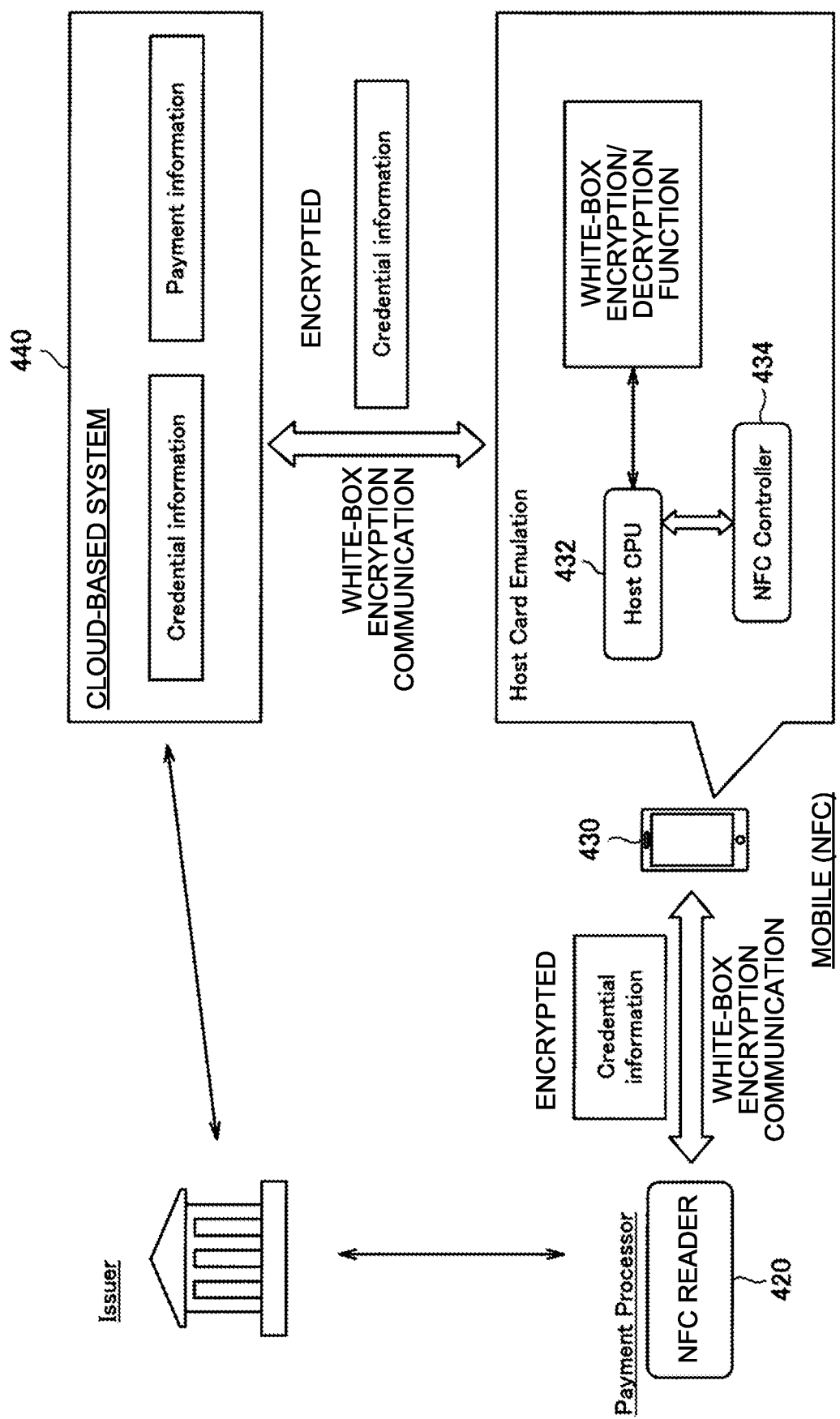
FIG. 34 is a schematic diagram illustrating FIG. 33 in more detail.

FIG. 34 is a schematic diagram illustrating FIG. 33 in more detail. A server 440 on a cloud includes information for certifying a user (Credential information) and Payment information. The user device 430 is an electronic appliance such as a mobile appliance, and performs encryption communication with the server 440 to exchange information for certification. The user device 430 also performs encryption communication with the reading device 420 to exchange the information for certification. In the encryption communication, encryption is performed by white-box encryption according to the embodiment. Thus, the user device 430 includes a white-box cipher function and a decryption function. By performing encryption by the white-box encryption, certification data related to payment can be protected, and emulation of NFC is enabled to be performed even if the user device 430 does not include a secure element 436.

Figure 35:
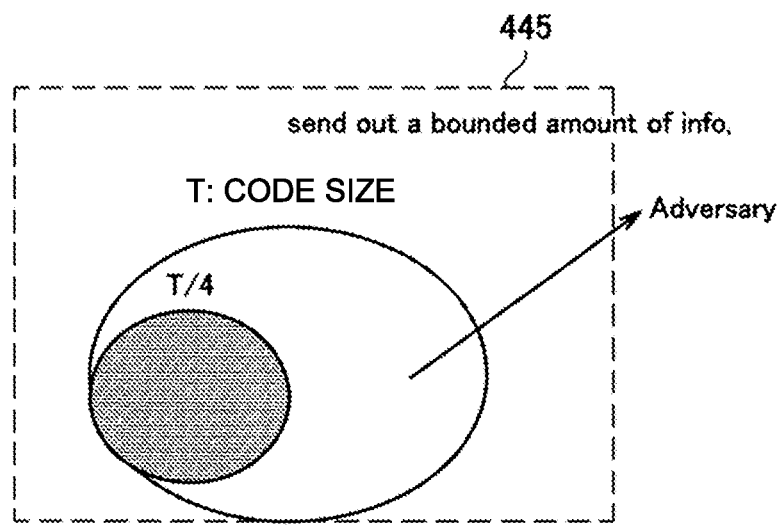
FIG. 35 is a schematic diagram illustrating a scheme that is secure against memory leak.

FIG. 35 is a schematic diagram illustrating a scheme that is also secure against memory leak. This system guarantees the security even in a case in which memory is leaked to the attacker due to vulnerability of software (buffer overflow, heart bleed), or malware. In a device 445 having vulnerability to malware or memory leak, the security is not lowered unless data of several kilobytes, several gigabytes, or more is leaked due to a property of Space hardness of the white-box encryption scheme. In the example of FIG. 35, assuming that the code size is T, the security is not lowered unless data of T/4 or more is leaked. Space hardness is a technique that can guarantee the security of the cipher unless memory of a certain size or more is leaked. This method is effective especially in a case in which communication traffic volume from an external network is limited by an internal network.

Figure 36:
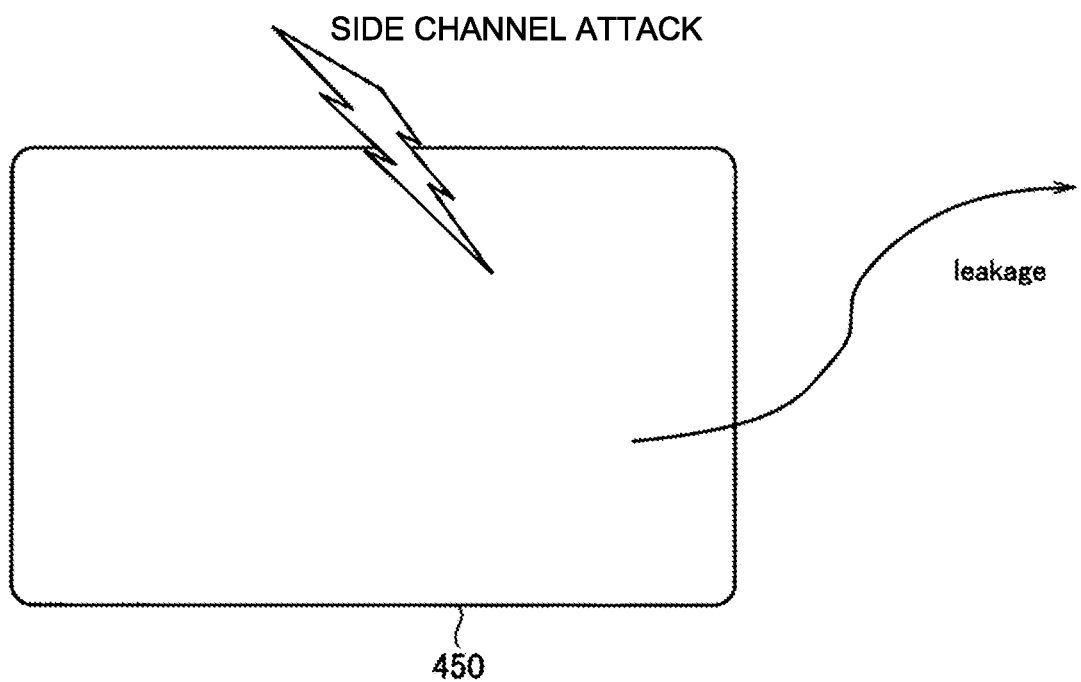
FIG. 36 is a schematic diagram illustrating an example of encryption that is secure against a side channel attack.

FIG. 36 is a schematic diagram illustrating an example of encryption that is secure against a side channel attack. The white-box encryption scheme is typically used for software, but can also be used for hardware as an encryption scheme that is secure against a side channel by being implemented using Reconfigurable Hardware (FPGA). For example, the encryption scheme is effective especially for a device that may be subjected to the side channel attack as hardware such as an IC card 450 illustrated in FIG. 36.

The preferred embodiment of the present disclosure has been described above in detail with reference to the attached drawings, but the technical scope of the present disclosure is not limited to such examples. A person ordinarily skilled in the art of the present disclosure can obviously conceive various examples of variations or modifications within a scope of technical idea described in CLAIMS, and it is obvious that these examples are also encompassed by the technical scope of the present disclosure.

The effects described in the present description are merely explanation or examples, and are not limitations. That is, the technique according to the present disclosure can exhibit another effect that is obvious to those skilled in the art from the description herein in addition to the effect described above, or in place of the effect described above.

The following configurations are also encompassed by the technical scope of the present disclosure.

(1) An encryption device comprising:
a data encryption part in which at least part of a plurality of round functions for successively performing encryption processing on an input value is tabulated to be encrypted using a white-box model in which input/output values of the round function are able to be recognized from the outside, wherein
each of the round functions includes a tabulated encryption function for encrypting an input value using a black-box model in which the input/output values are able to be recognized from the outside and an intermediate value is not able to be recognized from the outside, and
the encryption function is updated with a random number.
(2) The encryption device according to (1), wherein a first coefficient is exclusive-ORed to an input value of the encryption function, a second coefficient is exclusive-ORed to an output value of the encryption function, and at least the second coefficient is a random number.
(3) The encryption device according to (2), wherein the first coefficient is adjusted to be a value that cancels a change in the data encryption part that is caused when the second coefficient is exclusive-ORed to the output value.
(4) The encryption device according to (3), wherein the first coefficient of the encryption function in an optional round is adjusted to be a value that cancels a change in the input value to the encryption function in the optional round that is caused when the second coefficient is exclusive-ORed to the output value in a previous round of the optional round.
(5) The encryption device according to (1), wherein
part of bits to be input to the round function is input to the encryption function, and
the encryption function causes part of bits that are able to be input to the encryption function to be a fixed value and disregards part of output values of the encryption function to output an output value of the number of bits corresponding to a difference between the number of bits that are able to be input to the encryption function and the number of bits input to the encryption function.
(6) The encryption device according to (5), wherein the round function operates an exclusive OR of bits that are not input to the encryption function among the bits to be input to the round function and bits of the output value from the encryption function.
(7) The encryption device according to (6), wherein the round function outputs a value of bits input to the encryption function and a value of bits obtained by the exclusive OR.
(8) The encryption device according to (7), wherein the round function outputs the value of bits input to the encryption function as a lower-order bit than the value of bits obtained by the exclusive OR.
(9) The encryption device according to any one of (5) to (8), wherein an exclusive OR of an output of the round function and a predetermined value determined in advance is operated, and an obtained value is caused to be an input to the next round function or an output of the data encryption part.
(10) The encryption device according to any one of (1) to (9), wherein one of the round functions includes a plurality of the encryption functions.
(11) The encryption device according to any one of (5) to (9), wherein, among the round functions, a larger input value of bits is input to the encryption function for a round function at a later stage.
(12) The encryption device according to any one of (1) to (11), wherein
one of the round functions includes a plurality of the encryption functions,
bits to be input to the round function are divided to be input to the encryption functions,
the encryption functions perform a non-linear operation, and
the round function performs a linear transformation operation on a result of the non-linear operation performed by the encryption functions to be output.
(13) The encryption device according to (12), wherein the number of bits to be input and the number of bits to be output are the same for each of the encryption functions.
(14) The encryption device according to (9) or (13), wherein the numbers of bits to be input to the respective encryption functions are different.
(15) The encryption device according to any one of (1) to (14), wherein the encryption function performs encryption with an extended key that is generated from a secret key corresponding to the data encryption part.
(16) An encryption method comprising:
tabulating at least part of a plurality of round functions for successively performing encryption processing on an input value to be encrypted using a white-box model in which input/output values of the round function are able to be recognized from the outside, wherein
each of the round functions encrypts an input value with an encryption function that is tabulated in a black-box model in which the input/output values are able to be recognized from the outside and an intermediate value is not able to be recognized from the outside, and
the encryption function is updated with a random number.
(17) A decryption device comprising:
a data decryption part configured to perform decryption by an inverse operation of encryption processing, the encryption processing of tabulating at least part of a plurality of round functions for successively performing encryption processing on an input value to be encrypted using a white-box model in which input/output values of the round function is able to be recognized from the outside, wherein
each of the round functions encrypts an input value with an encryption function that is tabulated in a black-box model in which the input/output values are able to be recognized from the outside and an intermediate value is not able to be recognized from the outside, the encryption function to be updated with a random number.
(18) A decryption method comprising:
performing decryption by an inverse operation of encryption processing, the encryption processing of tabulating at least part of a plurality of round functions for successively performing encryption processing on an input value to be encrypted using a white-box model in which input/output values of the round function are able to be recognized from the outside, wherein
each of the round functions encrypts an input value with an encryption function that is tabulated in a black-box model in which the input/output values are able to be recognized from the outside and an intermediate value is not able to be recognized from the outside, the encryption function to be updated with a random number.

REFERENCE SIGNS LIST

200 DATA ENCRYPTION PART
300 TABLE

The invention claimed is:

1. An encryption device comprising:
a data encryption part in which part of at least one round function of a plurality of round functions for successively performing encryption processing on an input value is tabulated to be encrypted using a white-box model in which input/output values of the at least one round function using the white-box model are able to be recognized from the outside,
wherein each round function of the plurality of round functions includes a tabulated encryption function for encrypting an input value using a black-box model in which the input/output values are able to be recognized from the outside and an intermediate value is not able to be recognized from the outside,
wherein each tabulated encryption function is updated with a random number,
wherein at least one round function of the plurality of round functions includes a plurality of tabulated encryption functions,
wherein a first coefficient is exclusive-ORed to an input value of the encryption function, a second coefficient is exclusive-ORed to an output value of the encryption function, and at least the second coefficient is a random number,
wherein the first coefficient is adjusted to be a value that cancels a change in the data encryption part that is caused when the second coefficient is exclusive-ORed to the output value, and
wherein the data encryption part is implemented via at least one hardware processor.

2. The encryption device according to claim 1, wherein the first coefficient of the encryption function in an optional round is adjusted to be a value that cancels a change in the input value to the encryption function in the optional round that is caused when the second coefficient is exclusive-ORed to the output value in a previous round of the optional round.

3. The encryption device according to claim 1, wherein part of bits to be input to each round function is input to the encryption function, and
the encryption function causes part of bits that are able to be input to the encryption function to be a fixed value and disregards part of output values of the encryption function to output an output value of the number of bits corresponding to a difference between the number of bits that are able to be input to the encryption function and the number of bits input to the encryption function.

4. The encryption device according to claim 3, wherein each round function operates an exclusive OR of bits that are not input to the encryption function among the bits to be input to the round function and bits of the output value from the encryption function.

5. The encryption device according to claim 4, wherein each round function outputs a value of bits input to the encryption function and a value of bits obtained by the exclusive OR.

6. The encryption device according to claim 5, wherein each round function outputs the value of bits input to the encryption function as a lower-order bit than the value of bits obtained by the exclusive OR.

7. The encryption device according to claim 1, wherein an exclusive OR of an output of each round function and a predetermined value determined in advance is operated, and an obtained value is caused to be an input to the next round function or an output of the data encryption part.

8. The encryption device according to claim 3, wherein, among the plurality of round functions, a larger input value of bits is input to the encryption function for a round function at a later stage.

9. The encryption device according to claim 1, wherein bits to be input to the at least one round function including the plurality of tabulated encryption functions are divided to be input to the encryption functions,
the encryption functions perform a non-linear operation, and
the at least one round function performs a linear transformation operation on a result of the non-linear operation performed by the encryption functions to be output.

10. The encryption device according to claim 9, wherein the number of bits to be input and the number of bits to be output are the same for each of the encryption functions.

11. The encryption device according to claim 9, wherein the numbers of bits to be input to the respective encryption functions are different.

12. The encryption device according to claim 1, wherein the encryption function performs encryption with an extended key that is generated from a secret key corresponding to the data encryption part.

13. An encryption method comprising:
tabulating part of at least one round function of a plurality of round functions for successively performing encryption processing on an input value to be encrypted using a white-box model in which input/output values of the at least one round function using the white-box model are able to be recognized from the outside,
wherein each round function of the plurality of round functions encrypts an input value with an encryption function that is tabulated in a black-box model in which the input/output values are able to be recognized from the outside and an intermediate value is not able to be recognized from the outside,
wherein each tabulated encryption function is updated with a random number,
wherein at least one round function of the plurality of round functions includes a plurality of tabulated encryption functions,
wherein a first coefficient is exclusive-ORed to an input value of the encryption function, a second coefficient is exclusive-ORed to an output value of the encryption function, and at least the second coefficient is a random number, and
wherein the first coefficient is adjusted to be a value that cancels a change that is caused when the second coefficient is exclusive-ORed to the output value.

14. A decryption device comprising:
a data decryption part configured to perform decryption by an inverse operation of encryption processing, the encryption processing of tabulating part of at least one round function of a plurality of round functions for successively performing encryption processing on an input value to be encrypted using a white-box model in which input/output values of the at least one round function using the white-box model are able to be recognized from the outside,
wherein each round function of the plurality of round functions encrypts an input value with an encryption function that is tabulated in a black-box model in which the input/output values are able to be recognized from the outside and an intermediate value is not able to be recognized from the outside, each tabulated encryption function being updated with a random number, wherein at least one round function of the plurality of round functions includes a plurality of tabulated encryption functions, wherein a first coefficient is exclusive-ORed to an input value of the encryption function, a second coefficient is exclusive-ORed to an output value of the encryption function, and at least the second coefficient is a random number, wherein the first coefficient is adjusted to be a value that cancels a change in the data encryption part that is caused when the second coefficient is exclusive-ORed to the output value, and wherein the data decryption part is implemented via at least one hardware processor.

15. A decryption method comprising:

performing decryption by an inverse operation of encryption processing, the encryption processing of tabulating part of at least one round function of a plurality of round functions for successively performing encryption processing on an input value to be encrypted using a white-box model in which input/output values of the at least one round function using the white-box model are able to be recognized from the outside, wherein each round function of the plurality of round functions encrypts an input value with an encryption function that is tabulated in a black-box model in which the input/output values are able to be recognized from the outside and an intermediate value is not able to be recognized from the outside, each tabulated encryption function being updated with a random number, wherein at least one round function of the plurality of round functions includes a plurality of tabulated encryption functions, wherein a first coefficient is exclusive-ORed to an input value of the encryption function, a second coefficient is exclusive-ORed to an output value of the encryption function, and at least the second coefficient is a random number, and wherein the first coefficient is adjusted to be a value that cancels a change that is caused when the second coefficient is exclusive-ORed to the output value.

* * * * *